United States Patent
Yoshida et al.

(10) Patent No.: US 9,094,231 B2
(45) Date of Patent: Jul. 28, 2015

(54) ROUTER

(71) Applicant: Panasonic Corporation, Osaka (JP)

(72) Inventors: Atsushi Yoshida, Osaka (JP); Tomoki Ishii, Kyoto (JP); Takao Yamaguchi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 116 days.

(21) Appl. No.: 13/893,796

(22) Filed: May 14, 2013

(65) Prior Publication Data

US 2013/0250792 A1 Sep. 26, 2013

Related U.S. Application Data

(63) Continuation of application No. PCT/JP2012/003911, filed on Jun. 14, 2012.

(30) Foreign Application Priority Data

Jul. 22, 2011 (JP) .................... 2011-161149

(51) Int. Cl.
*H04L 12/40* (2006.01)
*H04L 12/861* (2013.01)

(52) U.S. Cl.
CPC ........ *H04L 12/4015* (2013.01); *H04L 49/9036* (2013.01); *H04L 49/9047* (2013.01)

(58) Field of Classification Search
CPC ......... H04L 12/56; H04L 12/57; H04L 49/90; H04L 49/91; H04L 49/30; H04L 49/31; H04L 49/32; H04L 49/33; H04L 2012/5679

USPC ......... 370/389, 412–417, 422, 428, 468, 474, 370/252
See application file for complete search history.

(56) References Cited

U.S. PATENT DOCUMENTS 6,570,876 B1 * 5/2003 Aimoto .................... 370/389
6,674,720 B1    1/2004 Passint et al.
(Continued)

FOREIGN PATENT DOCUMENTS

JP    2004-248105 A    9/2004
JP    2006-254450 A    9/2006
(Continued)

OTHER PUBLICATIONS

International Search Report for corresponding International Application No. PCT/JP2012/003911 mailed Jul. 31, 2012.
(Continued)

*Primary Examiner* — Dady Chery
(74) *Attorney, Agent, or Firm* — Renner, Otto, Boisselle & Sklar, LLP

(57) ABSTRACT

The router is used to relay a packet to be transmitted from one node to another in an integrated circuit that has distributed buses according to a packet exchange method. The router includes: a plurality of buffers, each of which configured to store packets with information indicating their transmission node; a classifying section configured to classify the buffers that store the packets into a number of groups according to the transmission nodes of the packets; a selecting section configured to select at least one of the buffers of each group; and an output port configured to sequentially output the packets that are stored in the selected buffer.

14 Claims, 31 Drawing Sheets

(56) References Cited

U.S. PATENT DOCUMENTS

| | | |
|---|---|---|
| 2006/0203825 A1 | 9/2006 | Beigne et al. |
| 2009/0043934 A1 | 2/2009 | Bjerregaard |
| 2010/0172366 A1 | 7/2010 | Inoue et al. |
| 2011/0026405 A1 | 2/2011 | Takagi et al. |

FOREIGN PATENT DOCUMENTS

| | | |
|---|---|---|
| JP | 2007-306623 A | 11/2007 |
| JP | 2008-131602 A | 6/2008 |
| JP | 2008-532145 T | 8/2008 |
| WO | 2009/133918 A1 | 11/2009 |

OTHER PUBLICATIONS

W. Daily and B. Towles, "Principles and Practices of Interconnection Networks", Morgan Kaufmann Publishers, pp. 363-376, 2004.

Notice of Reasons for Rejection for corresponding Japanese Application No. 2013-506019 mailed Apr. 15, 2014 (with English translation).

* cited by examiner

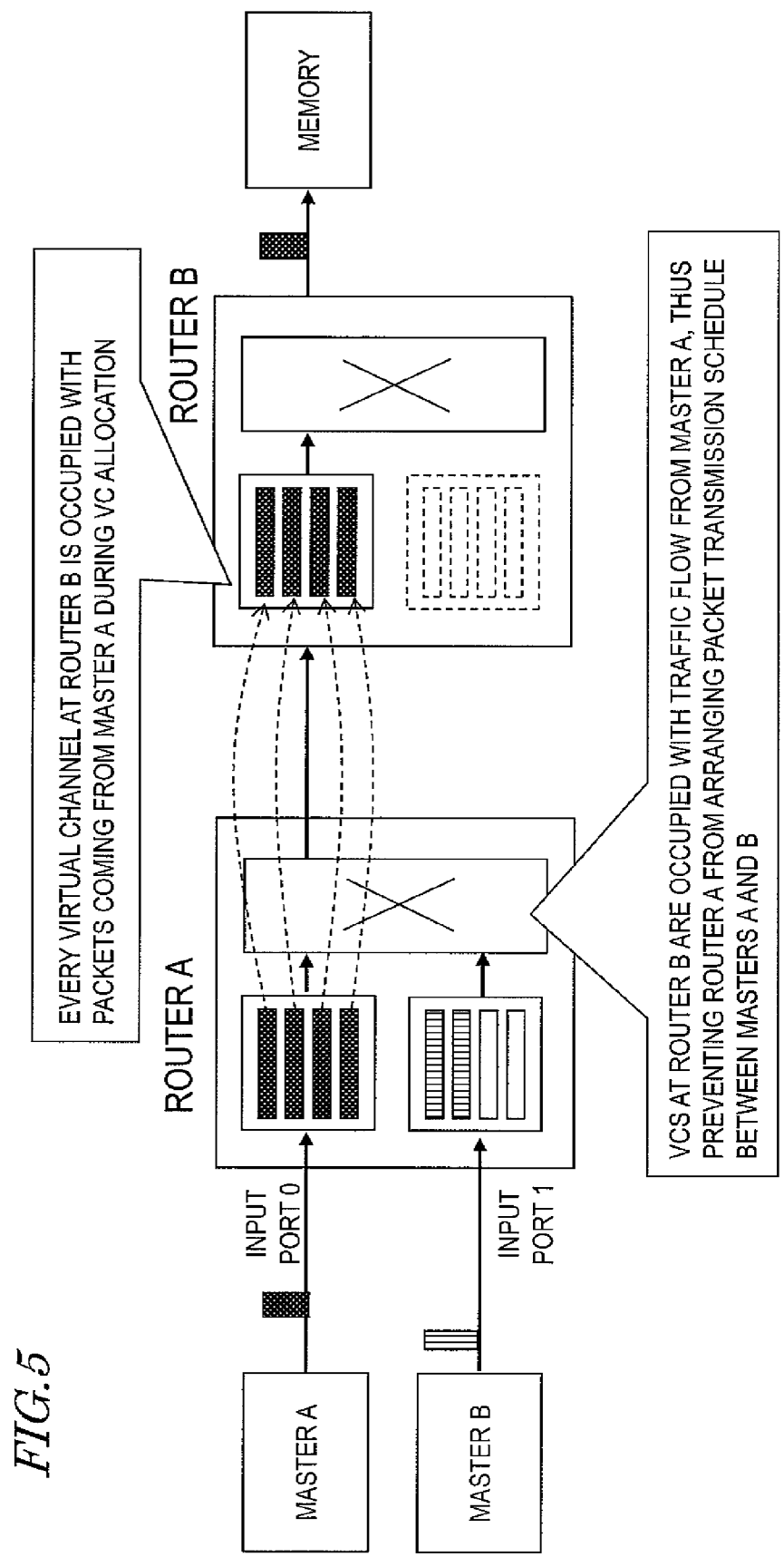

| INPUT PORT NUMBER | VIRTUAL CHANNEL NUMBER | TRANS-MISSION NODE ADDRESS | DESTINA-TION ADDRESS | TIME INFORMATION (DEADLINE) | OUTPUT PORT NUMBER | OUTPUT CHANNEL NUMBER |
|---|---|---|---|---|---|---|
| 0 | 2 | 0010 | 0101 | 0...090 | 0 | 1 |

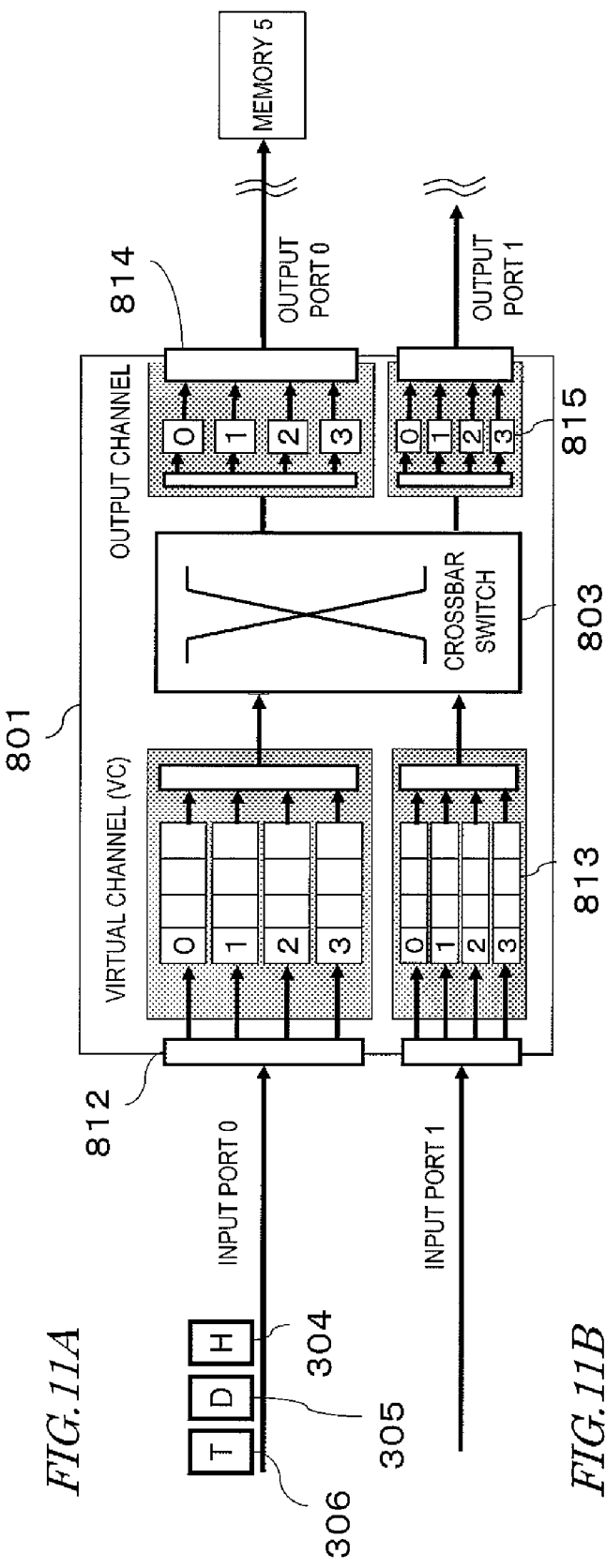

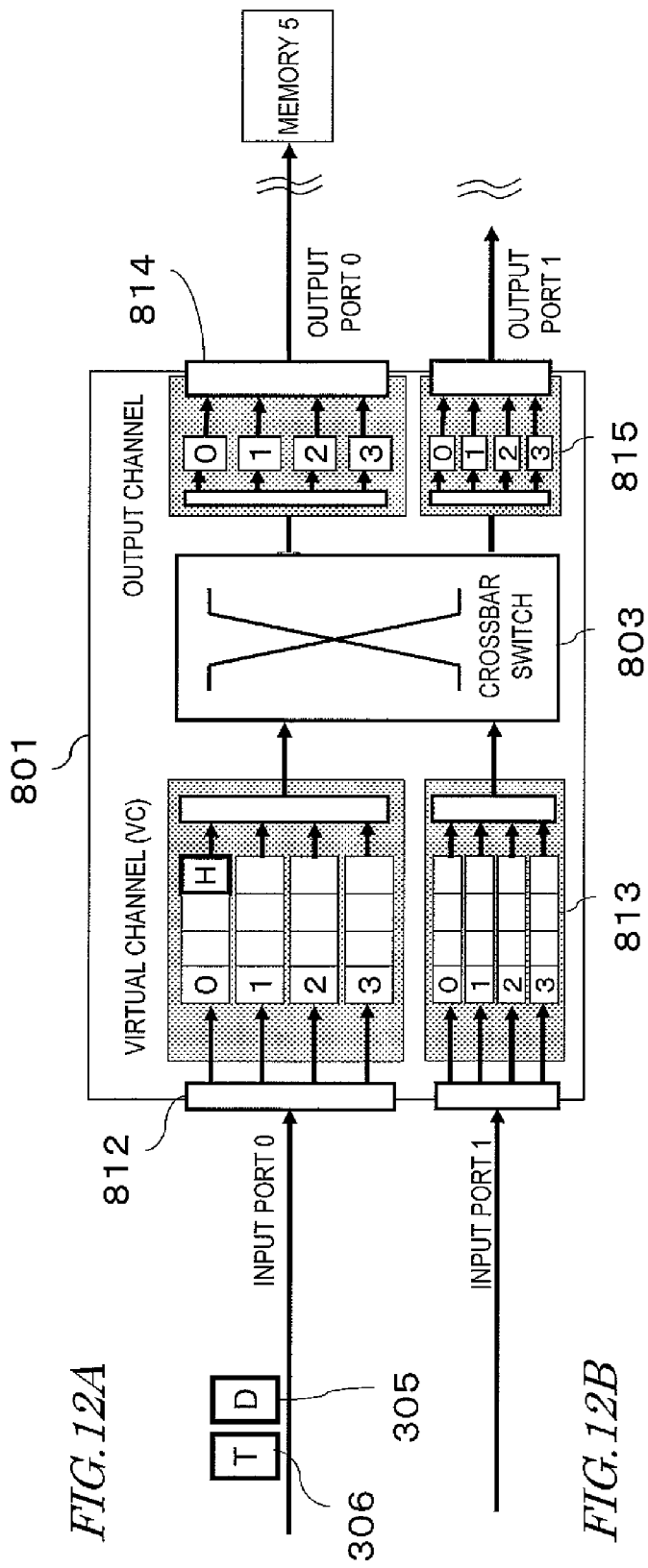

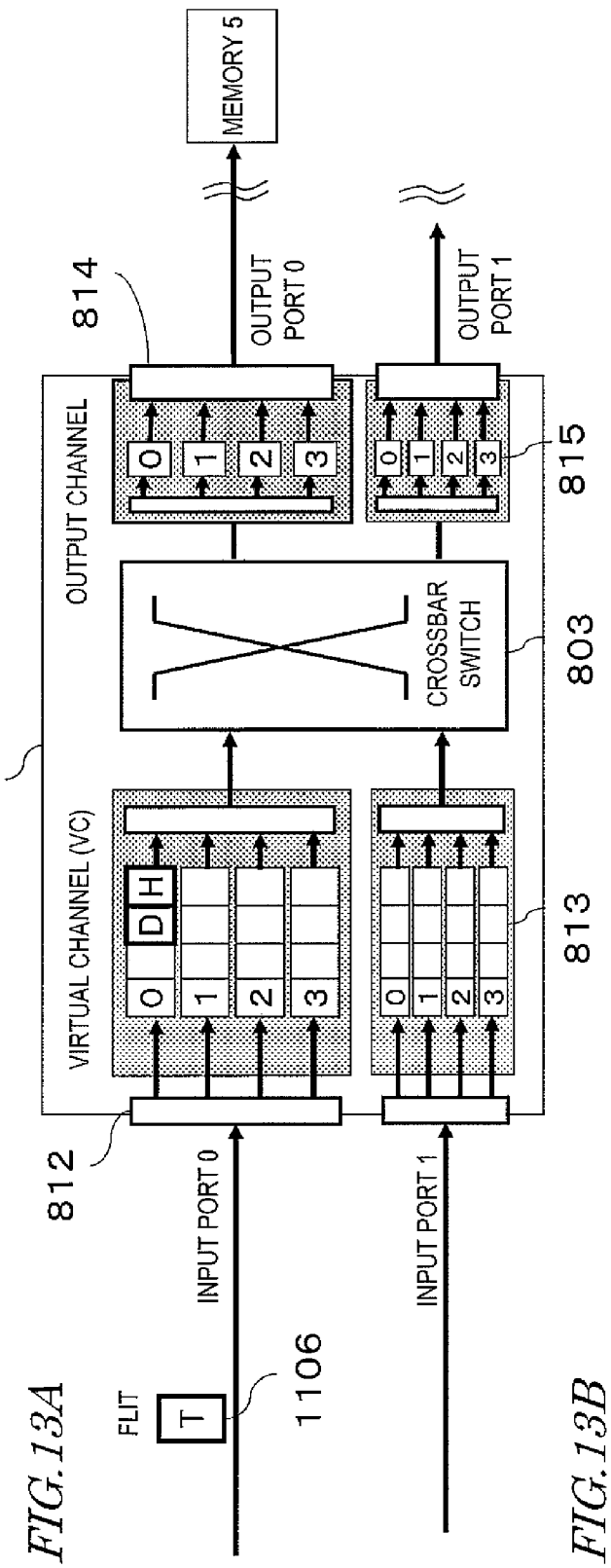

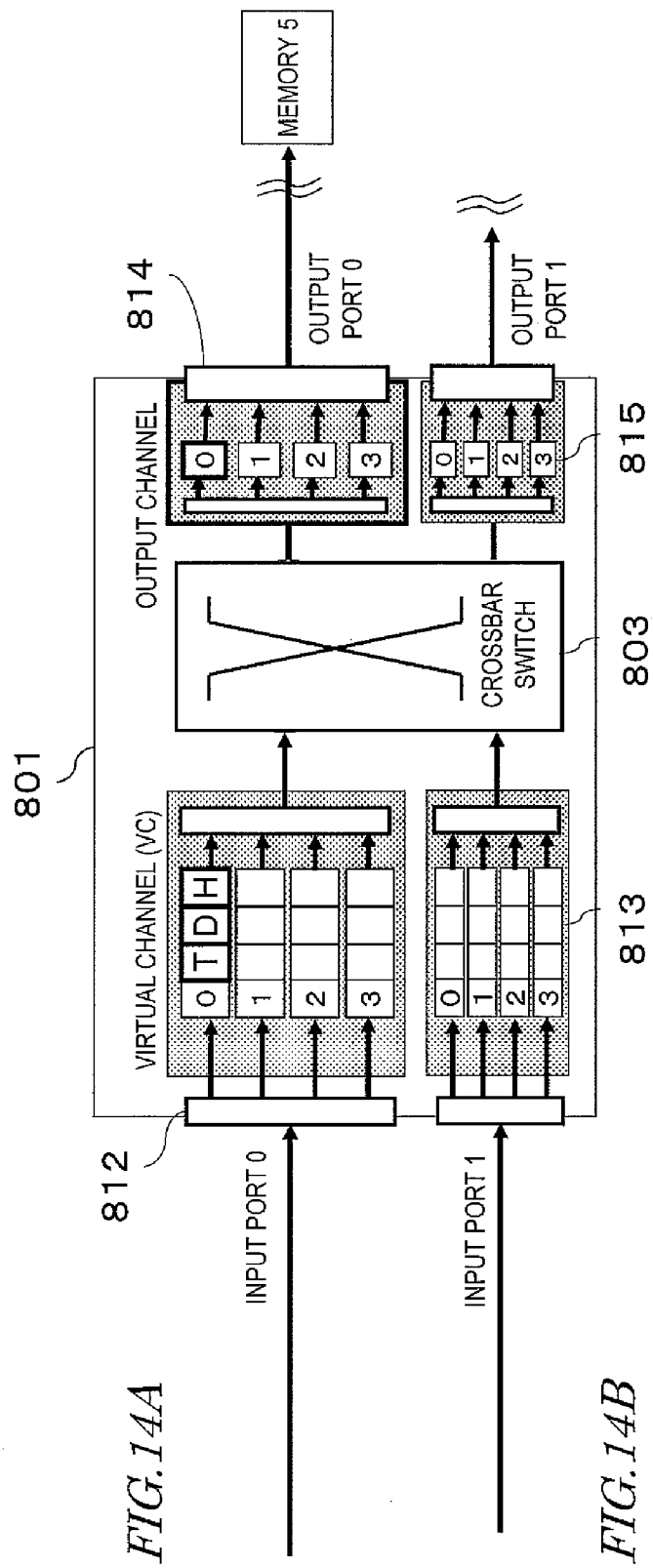

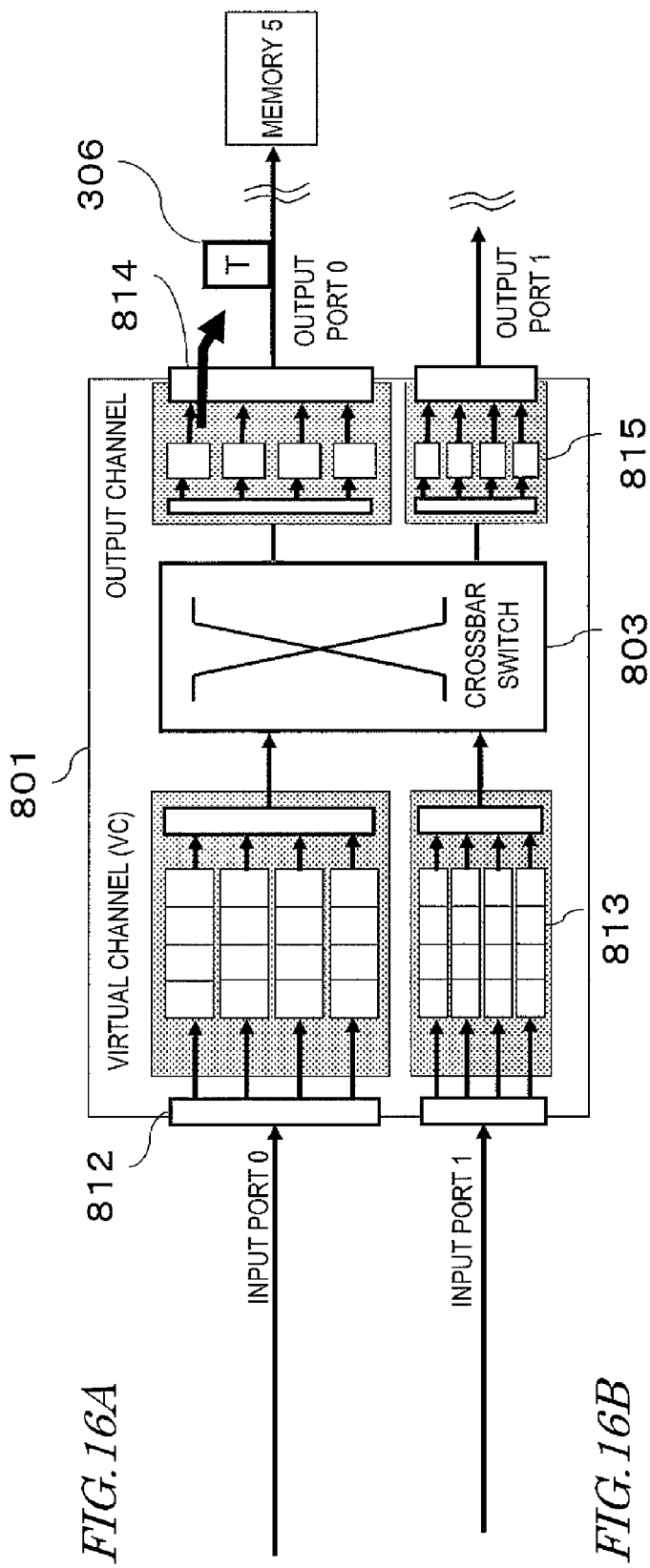

*FIG.19*

| | | TRANSMISSION NODE ADDRESS | | | | | |
|---|---|---|---|---|---|---|---|
| | | 010 | | 110 | | 111 | |
| | | VIRTUAL CHANNEL NUMBER | DEADLINE | VIRTUAL CHANNEL NUMBER | DEADLINE | VIRTUAL CHANNEL NUMBER | DEADLINE |
| ORDER OF PRIORITIES | 1 | INPUT PORT 0 VIRTUAL CHANNEL 1 | 0...140 | INPUT PORT 1 VIRTUAL CHANNEL 1 | 0...130 | INPUT PORT 1 VIRTUAL CHANNEL 0 | 0...118 |
| | 2 | — | — | — | — | INPUT PORT 1 VIRTUAL CHANNEL 3 | 0...125 |
| | 3 | — | — | — | — | — | — |
| NUMBER OF OUTPUT CHANNELS SET | | 1 | | 0 | | 0 | |

| INPUT PORT NUMBER | VIRTUAL CHANNEL NUMBER | TRANS-MISSION NODE ADDRESS | DESTINA-TION ADDRESS | TIME INFORMATION (DEADLINE) | OUTPUT PORT NUMBER | OUTPUT CHANNEL NUMBER |
|---|---|---|---|---|---|---|
| 0 | 2 | 0010 | 0101 | 0...090 | 0 | 1 |

| TYPES OF PRIORITIES ACCORDING TO TIME INFORMATION | CRITERIA OF PRIORITIZATION |
|---|---|
| TIME WHEN PACKET WAS TRANSMITTED | PACKET TRANSMITTED EARLIEST FIRST |
| AMOUNT OF TIME PASSED SINCE PACKET WAS TRANSMITTED | PACKET TRANSMITTED LONGEST TIME AGO FIRST |
| DEADLINE BY WHICH PACKET SHOULD ARRIVE AT RECEPTION NODE | PACKET WITH EARLIEST DEADLINE FIRST |
| TIME LEFT BEFORE THE DEADLINE | PACKET WITH SHORTEST TIME LEFT BEFORE DEADLINE FIRST |

FIG.29

| | | TRANSMISSION NODE ADDRESS | | | | | |
|---|---|---|---|---|---|---|---|
| | | 010 | | 110 | | 111 | |
| | | VIRTUAL CHANNEL NUMBER | DEADLINE | VIRTUAL CHANNEL NUMBER | DEADLINE | VIRTUAL CHANNEL NUMBER | DEADLINE |
| ORDER OF PRIORITIES | 1 | INPUT PORT 0 VIRTUAL CHANNEL 1 | 0...140 | — | — | — | — |
| | 2 | — | — | INPUT PORT 1 VIRTUAL CHANNEL 1 | 0...130 | INPUT PORT 1 VIRTUAL CHANNEL 0 | 0...118 |
| | 3 | — | — | — | — | INPUT PORT 1 VIRTUAL CHANNEL 3 | 0...125 |
| ① NUMBER OF OUTPUT CHANNELS SET | | 1 | | 1 | | 1 | |
| ② NUMBER OF OUTPUT CHANNELS ALLOCATED | | 1 | | 1 | | 2 | |
| DIFFERENCE =(①-②) | | 0 | | 0 | | 1 | |

ROUTER

This is a continuation of International Application No. PCT/JP2012/003911, with an international filing date of Jun. 14, 2012, which claims priority of Japanese Patent Application No. 2011-161149, filed on Jul. 22, 2011, the contents of which are hereby incorporated by reference.

BACKGROUND

1. Technical Field

The present application relates to a technology for arranging a transmission schedule for a plurality of traffic flows that run through multiple routers, which are connected together through distributed buses, in a semiconductor integrated circuit including such a bus. More particularly, the present application relates to a technique for controlling the transmission of packets which are constituent units that form multiple different traffic flows and which are stored and distributed in a plurality of buffers.

2. Description of the Related Art

Portion (A) of FIG. 1 illustrates an example of a centralized bus control. In a traditional integrated circuit that performs such a centralized bus control, a number of bus masters and a memory are connected together with a single bus, and accesses to the memory by the respective bus masters are arbitrated by an arbiter. However, as the functionality of an integrated circuit has been further improved and as the number of cores in an integrated circuit has been further increased these days, the scale of the circuit has become even larger and the traffic flows running through the bus has gotten even more complicated. As a result, it has become increasingly difficult to design an integrated circuit by such a centralized bus control.

Meanwhile, semiconductor integrated circuits with distributed buses have been developed one after another lately by introducing parallel computerized connection technologies and network control technologies such as ATM (asynchronous transfer mode). Portion (B) of FIG. 1 illustrates an example of a distributed bus control. In a semiconductor integrated circuit with distributed buses, a number of routers are connected together with multiple buses. Recently, people have been working on a so-called "Network on Chip (NoC)" in which the traffic flows in a large-scale integrated circuit are transmitted through a number of buses by adopting the distributed buses such as the one shown in portion (B) of FIG. 1.

FIG. 2 illustrates generally a basic configuration for a router for use in the NoC, parallel computers, ATM network, and so on. In such a router, traffic data is divided into a number of small units such as packets or cells, each of which is transmitted to its destination node. The data that has been sent to the router is temporarily retained in buffers.

Also, in order to transmit a number of different packets in parallel with each other through each input port, a virtual channel (which is sometimes called a "VC"), in which multiple buffers are connected in parallel with each other, is provided for each input port. That is to say, each virtual channel substantively consists of multiple buffer memories for a router. In this case, a number of buffers may actually be physically arranged for and with respect to each input port. Alternatively, a virtual channel may also be provided even by managing the data on a single buffer memory as if there were multiple buffers there.

In addition, a crossbar switch is further arranged in order to determine an exclusive connection between each input port and its associated output port. The exclusive connection between an input port and its associated output port via the crossbar switch is also determined by an arbiter.

By getting the crossbar switch turned by the arbiter in this manner, the router relays the data that is retained in the buffers to a destination.

Next, it will be described how to change the connection between an input port of a router and its associated output port. Each input port of a router and its associated output port are connected exclusively with each other via the crossbar switch. In this description, the "exclusive connection" refers to a situation where when multiple input ports and multiple output ports need to be connected at a time, not more than one input port is connected to one output port.

Next, the data structure of data to be transmitted by a NoC router will be described.

FIG. 3 illustrates an exemplary transmission format for a packet 300 and how the packet 300 may be divided into multiple flits.

Unlike a router to be generally used in parallel computers and ATM networks, a NoC router transmits a packet which has been generated at a transmission node after having divided the packet into multiple units called "flits" of a size that is small enough to send it in one cycle through a bus.

The packet 300 includes a header field 301, a data field 302, and a control code field 303.

In the header field 301, described are the receiving end's (i.e., reception node's) address, the transmitting end's (i.e., transmission node's) address, information about the deadline by which a packet transmitted should arrive at the reception node (which will be referred to herein as "time information"), for example. The time information may be described in any form as long as the amount of time that has passed since one packet was transmitted or the deadline by which the packet should arrive at the destination can be compared to another packet's.

In the data field 302, on the other hand, video data or audio data may be described, for example. In the control code field 303, the end code of a predetermined packet 300 may be described, for example.

The processing of relaying the packet 300 and the processing of receiving the packet 300 at the receiving end are performed based on the reception node's address and the transmission node's address among the data stored in the header field 301.

Each node on the transmitting end transmits the packet 300 after having divided it into smaller data units called "flits". In this case, one flit is data that can be transmitted through the bus in one cycle and its size is determined by the width of the bus. Among those flits obtained by dividing one packet 300, the flit to be transmitted first is called a "header flit" 304, to which flag information indicating that this flit is located at the beginning of a packet and information about the reception node's address of the packet are added.

It should be noted that the address information indicating the location of the reception node is not stored in any of the flits that follow the header flit 304. This is because those flits that follow the header flit 304 are supposed to be sent to the same destination as the header flit 304. When the destination is determined by the header flit 304 and when an output buffer to which the flits in that traffic are output is determined, the flits that follow the header flit 304 are transmitted to the destination indicated by the header flit 304 by using the same output buffer as what is used by the header flit 304.

On the other hand, the last flit of one packet is called a "tail flit" 306, to which added is flag information indicating that this is the last one of the flits that form one packet. Meanwhile, the flits other than the header flit 304 and the tail flit 306 are mainly used to transmit data and are called "data flits" 305.

On detecting the end code that is described in the control code field 303, the node on the receiving end restores those flits transmitted into the original packet based on that end code.

For example, one packet may have a size of 128 bytes, and one flit may have a size of 64 bits. In that case, one packet is transmitted after having been divided into 16 flits. It should be noted, however, that these sizes are just an example because one packet size and one flit size may vary according to the application or the bus width. Optionally, the length of a flit may be determined by a length that can describe control data using the reception node's address and the transmission node's address, for example.

FIG. 4A is a flowchart showing a series of processing operations to be performed by each router in a NoC in order to transmit a packet that has been received by the router to either an adjacent router or a reception node.

On the other hand, FIG. 4B illustrates a configuration for virtual channels which contribute to transmitting the flits as shown in FIG. 4A. In the example illustrated in FIG. 4B, each router has two input ports and two output ports, and each input port is provided with two virtual channels (VCs) to store flits.

One of the virtual channels of each input port gets connected to the output port by turning a crossbar switch SW, thereby transmitting the flits in the virtual channel through the output port. In FIG. 4B, the virtual channels VC1 and VC2 of only Input Port 0 are illustrated and the virtual channels of input port 1 are not illustrated for the sake of simplicity.

FIG. 4C shows the cycle-by-cycle state transitions of respective flits since a packet has been received at a router and until the packet is transmitted to either the next router or a reception node.

In order to relay a packet that has been divided into multiple flits to its destination, a router in a NoC carries out, on the flits received, all or part of routing computation (RC) processing, virtual channel allocation (VA) processing, switch allocation (SA) processing, and switch traversal (ST) processing (see, for example, W. Dally and B. Towles, "Principles and Practices of Interconnection Networks", Morgan Kaufmann Publishers).

Hereinafter, the basic operation of a router in a NoC will be described with reference to the flowchart shown in FIG. 4A and the block diagram shown in FIG. 4B first. In the following description, the upstream router will be referred to herein as "Router A" and the downstream router will be referred to herein as "Router B" as shown in FIG. 4B.

First, in Step 401 shown in FIG. 4A, Router A determines whether or not there is any virtual channel VC with flits. If the answer is YES, the processing performed by Router A advances to the next processing step 402. Otherwise, this processing step 401 will be performed over and over again until the decision is made that there is a virtual channel with flits.

If there is any virtual channel VC with flits, Router A determines, in the next processing step 402, whether or not the first one of the flits of that virtual channel VC is a header flit. If the answer is YES, the processing performed by Router A advances to the next processing step 403. Otherwise, the processing performed by Router A jumps to a processing step 405.

In the example illustrated in FIG. 4B, Router A has one virtual channel with a header flit. Thus, the processing performed by Router A advances to the next processing step 403.

If the first flit of the virtual channel has turned out to be a header flit, Router A carries out routing computation (RC) processing in this processing step 403 by reference to the destination information that is described in that header flit. By performing the routing computation processing, Router A selects one output port that leads to the destination of the packet.

In the example illustrated in FIG. 4B, Router A selects Output Port 0, which is connected to Router B that leads to the destination, by performing the routing computation processing.

After the output port has been selected by performing the routing computation processing, the processing advances to the next processing step 404, in which it is determined in which virtual channel of the adjacent Router B the packet to be transmitted from Router A needs be stored.

In a NoC, a packet is relayed after having been divided into multiple flits. Also, the basic information that is required to perform the routing control is described in only the header flit. That is why if flits of two or more different packets were mixed in the same virtual channel, those flits could not be delivered to the correct destination or the flits that have been delivered to the destination could not be restored into the original packet in some cases.

Thus, to avoid such an unwanted situation, each router in the NoC gets each single virtual channel occupied by a particular packet since the header flit of that packet has passed through the virtual channel and until the tail flit of that packet passes through the virtual channel and prohibits flits of any other packet from passing through that virtual channel occupied.

For example, Router A shown in FIG. 4B allocates one unused virtual channel in Router B, to which the flits are going to be transmitted, to the virtual channel VC1 that stores the header flit, thereby performing the virtual channel allocation (VA) processing.

When the virtual channel allocation (VA) processing is done, the processing by Router A advances to the next processing step 405.

However, if there are no unused virtual channels in the adjacent Router B, then Router A retries this processing step 404 over and over again until any of the virtual channels of Router B becomes available to allow Router A to complete the virtual channel allocation (VA) processing.

In the example illustrated in FIG. 4B, Router A selects the virtual channel VC1 of Router B as a buffer to store the flits and allocates the virtual channel VC1 to its own virtual channel VC1 that stores the header flit.

When the routing computation (RC) processing and the allocation of the virtual channel to store the flits in the adjacent router (i.e., the VA processing) are finished, the processing by Router A advances to the next processing step 405, in which Router A waits until the flits stored are transmitted.

In the processing step 405, in order to transmit the flits from the virtual channel, Router A turns the crossbar switch to allocate its own virtual channel VC1 to its output port (this is the switch allocation (SA) processing).

If multiple virtual channels are requesting to transmit flits through a single output port, then switch allocation (SA) processing is carried out in order to determine, on an output port basis, which virtual channel is allowed to transmit flits through a given output port.

Optionally, in this switch allocation processing, a router of the NoC may adjust, by reference to various kinds of information including the type of a given packet (such as a delay guaranteed type or a best effort type), the priority, the time of transmission, and the deadline for arrival, how long a virtual channel that stores the packet may be connected to an output port. Then, the schedule for transmitting packets from multiple different transmission nodes can be arranged.

When an output port is allocated and connected to the virtual channel that is waiting until the flits are ready to be transmitted as a result of the switch allocation (SA) processing step 405, the processing by Router A advances to the next processing step 406, in which Router A transmits the flits in the virtual channel connected through the output port selected (this is the switch traversal (ST) processing).

By performing this series of processing steps 401 through 406 on each virtual channel in this manner, the router transmits the flits received to the destination.

Hereinafter, it will be described with reference to FIG. 4C exactly how Router A shown in FIG. 4B relays a single packet. In the following example, it will be described how the flits are processed at respective points in time on the supposition that each packet is comprised of four flits.

First of all, when a header flit arrives at Router A at a time 1, Router A carries out routing computation (RC) processing by reference to the destination information included in the header flit, thereby selecting an output port through which flits will be transmitted next.

Next, at a time 2, Router A carries out virtual channel allocation (VA) processing, thereby determining to which virtual channel of Router B, to which the output port that has been selected through the routing computation processing (RC) is connected, the virtual channel that stores the header flit should be connected.

Meanwhile, at this point in time 2, Data Flit 1 arrives at Router A. However, as the header flit is already present at the top of the virtual channel, no processing is carried out on Data Flit 1.

Next, at a time 3, Router A carries out switch allocation (SA) processing, thereby determining which output port is allocated to the virtual channel that stores the header flit at the top.

Meanwhile, at this point in time 3, Data Flit 2 also arrives at Router A. However, as the header flit is already present at the top of the virtual channel, no processing is carried out on Data Flits 1 and 2.

Next, at a time 4, Router A transmits the header flit (which is the switch traversal (ST) processing). However, even after the header flit has been transmitted, the switch allocation (SA) processing is carried on to keep the same virtual channel-output port pair connected continuously.

Meanwhile, at this point in time 4, Tail Flit also arrives at Router A. However, as Data Flit 1 is already present at the top of the virtual channel, no processing is carried out on Data Flit 2 and Tail Flit.

Next, at a time 5, Router A transmits Data Flit 1 (which is the switch traversal (ST) processing). However, even after Data Flit 1 has been transmitted, the switch allocation (SA) processing is carried on to keep the same virtual channel-output port pair connected continuously. As Data Flit 1 is already present at the top of the virtual channel, no processing is carried out on Data Flit 2 and Tail Flit.

Next, at a time 6, Router A transmits Data Flit 2 (which is the switch traversal (ST) processing). However, even after Data Flit 2 has been transmitted, the switch allocation (SA) processing is carried on to keep the same virtual channel-output port pair connected continuously.

Finally, at a time 7, Router A transmits Tail Flit (which is the switch traversal (ST) processing). In this manner, one packet can be relayed completely.

This series of processing steps to be carried out to relay a single packet as shown in FIG. 4C is an example in which each processing step is supposed to be finished in one cycle. However, if it has turned out as a result of the virtual channel allocation (VA) processing that there is no virtual channel available from Router B to which a flit is going to be output, the virtual channel allocation (VA) cannot be completed until there is any virtual channel available. As a result, this routing processing should wait until this and following flits are ready to be transmitted.

The same can be said about the switch allocation (SA) processing. That is to say, if multiple virtual channels request to transmit flits through the same output port, then the transmission schedule needs to be arranged so that the output port is allocated to those virtual channels one by one. As a result, transmission of those flits should wait in such a situation.

Generally speaking, a larger number of transmission buffers (or virtual channels) can be secured for a packet of the same size in a router for use in a parallel computer or ATM than in a router for use in a NoC. That is why the influence of such a delay in the virtual channel allocation (VA) processing due to the shortage of virtual channels is less significant in the former type of router than in the latter. Meanwhile, it is far more important for the router of the former type to optimize the transmission schedule in order to transmit the respective flits in the transmission buffer (virtual channel) as efficiently as possible. That is why as for a router for use in a parallel computer or an ATM, a "wavefront allocator" which searches for the best possible combination of a transmission buffer (virtual channel) and an output port, "parallel iterative machining" which chooses the best combinations iteratively on the input port and output port sides of a router, and other techniques have been adopted (see W. Daily and B. Towles, "Principles and Practices of Interconnection Networks", Morgan Kaufmann Publishers, for example).

On the other hand, in some situation, multiple virtual channels may request to be connected to the same output port at the same time. To cope with such a situation, a so-called "age-based" method has been proposed in U.S. Pat. No. 6,674,720, for example. According to that method, a value called "age" is defined based on the length of the time that passed since a packet was transmitted and the number of hops that the packet has made in order to maintain the order in which a number of packets have been transmitted and to minimize an increase in time delay between the packets or their difference. And according to the "age-based" method, a packet with the maximum (or minimum) age is supposed to be transmitted first.

SUMMARY

On the other hand, in a NoC, a number of routers need to be arranged on an integrated circuit, and therefore, the number or the size of virtual channels that can be arranged on each router is smaller than that of a parallel computer or ATM network. According to the NoC, the size of one virtual channel is typically as large as one packet.

That is why in a NoC, it is important to allocate such a limited number of virtual channels (i.e., carry out the virtual channel allocation (VA) processing) as efficiently as possible so that the transmission schedule can be arranged appropriately in a shorter time delay during the switch allocation (SA) processing with respect to multiple packets to be transmitted from multiple different transmission nodes.

A non-limiting exemplary embodiment of the present application provides a router which improves the overall transmission performance of a NoC by minimizing a decline in the transmission performance (such as the throughput or time delay) of a packet that has been transmitted from a particular transmission node.

In one general aspect, a router disclosed herein relays a packet to be transmitted from one node to another in an integrated circuit that has distributed buses according to a packet exchange method. The router includes: a plurality of buffers, each of which configured to store packets with information indicating their transmission node; a classifying section configured to classify the buffers that store the packets into a number of groups according to the transmission nodes of the packets; a selecting section configured to select at least one of the buffers of each said group; and an output port configured to sequentially output the packets that are stored in the selected buffer.

A router according to the above aspect uniformly allocates virtual channels to be used by adjacent routers to multiple packets with the transmission node identified and without increasing the size or number of virtual channels in the router, thereby preventing packets coming from the same transmission node from occupying a virtual channel. As a result, the router can maintain the same transmission schedule with respect to packets coming from multiple different transmission nodes, and a decline in the transmission performance of a NoC can be reduced in terms of the throughput and the delay.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

Portion (A) of FIG. 1 illustrates an example of a centralized bus control and portion (B) of FIG. 1 illustrates an example of a distributed bus control.

FIG. 5 illustrates one of the problems that the present inventors considered.

FIG. 9 is a table showing exemplary contents of virtual channel information 901 to be managed by, and stored in, a virtual channel information management section 805.

FIG. 11A illustrates how the virtual channels 813 are used or unused in the router 801.

FIG. 11B shows the contents of the virtual channel information 901 at a point in time when the router 801 has not received any flit yet at Input Port 0.

FIG. 12A illustrates how a header flit 304 that has arrived at Input Port 0 has just been stored on Virtual Channel 0.

FIG. 12B shows the contents of the virtual channel information 901 that has been updated with the respective addresses of the transmission and destination nodes and the transmission time information that are described in the header flit 304.

FIG. 13A illustrates how the data flit has also been stored on Virtual Channel 0 after the header flit.

FIG. 13B shows the contents of the virtual channel information 901 at a point in time when the router 801 has allocated an output port 814 to the virtual channels 815.

FIG. 14A illustrates how the tail flit 306 has also been stored on Virtual Channel 0 after the header flit 304 and the data flit 305.

FIG. 14B shows the contents of the virtual channel information 901 after the output channel 815 has been selected in the router 801.

FIG. 16A illustrates the status of the respective virtual channels 813 at a point in time by which the tail flit has been transmitted from the router 801.

FIG. 16B shows the contents of the virtual channel information 901 at a point in time by which the tail flit 306 has been transmitted.

FIG. 19 shows exemplary results of the virtual channel classification that has been done by the transmission node classifying section 807 in a situation where the virtual channels 813 of the router 801 are in the statuses shown in FIG. 18B.

FIG. 21 shows an example of time information and exemplary criteria on which packets may be prioritized by reference to the time information.

FIG. 29 shows how the number of output channels allocated determining section 2402 may operate.

Figure 30:
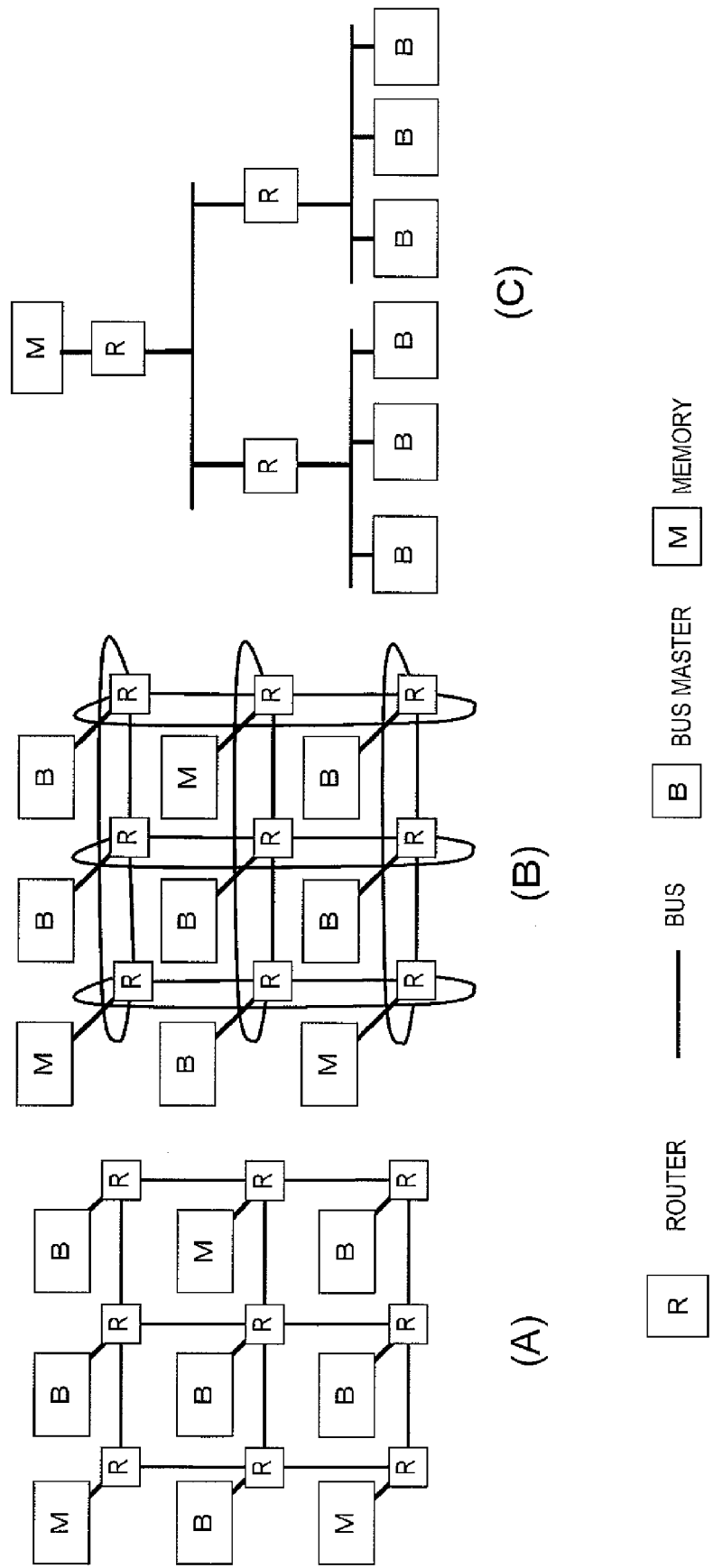

Portions (A), (B), and (C) of FIG. 30 illustrate examples of a mesh-type topology, a torus-type topology and a hierarchical topology, respectively.

Figure 31:
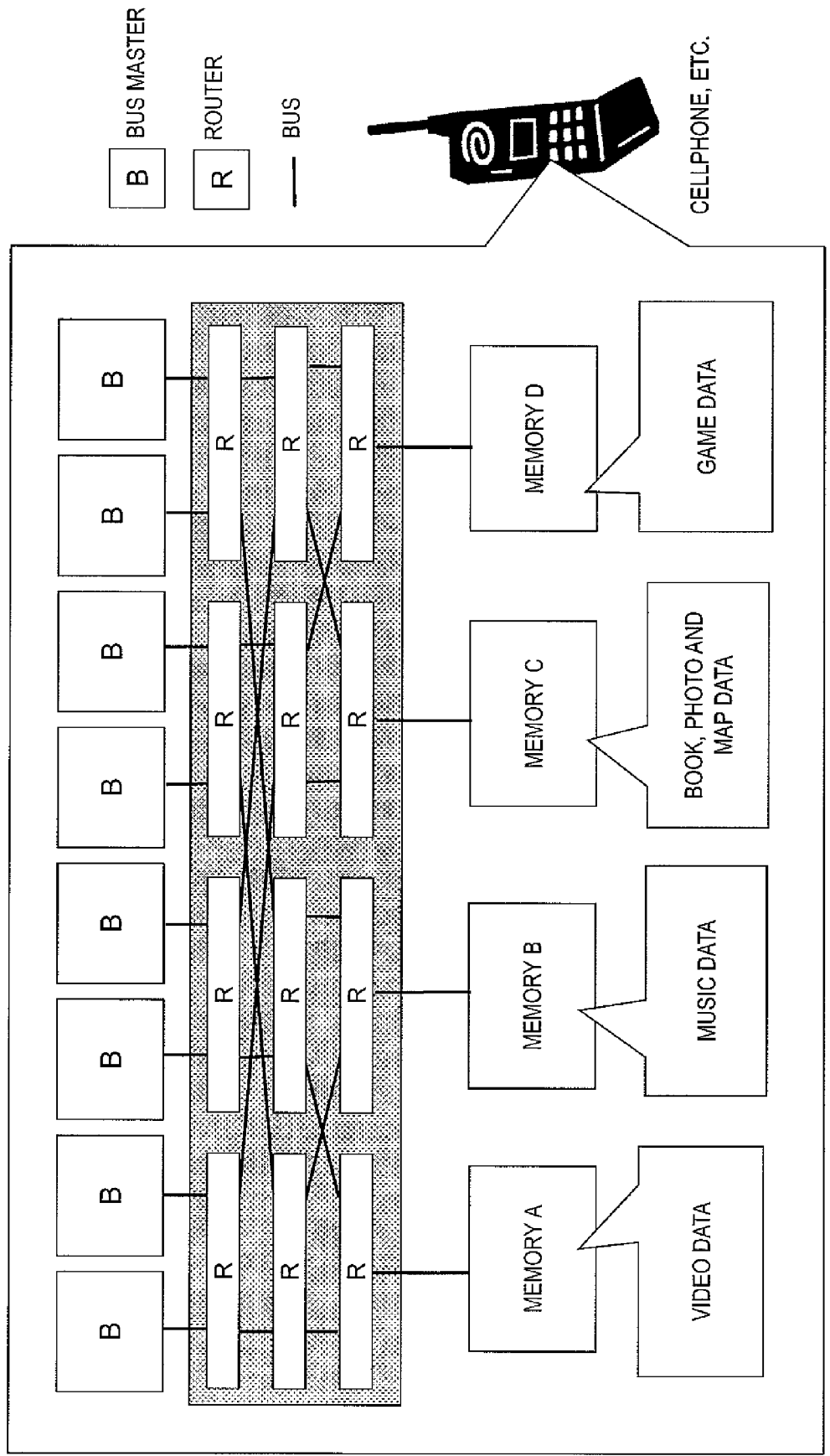

FIG. 31 illustrates an example in which a router according to an embodiment of the present disclosure is applied to a memory bus.

Figure 32:
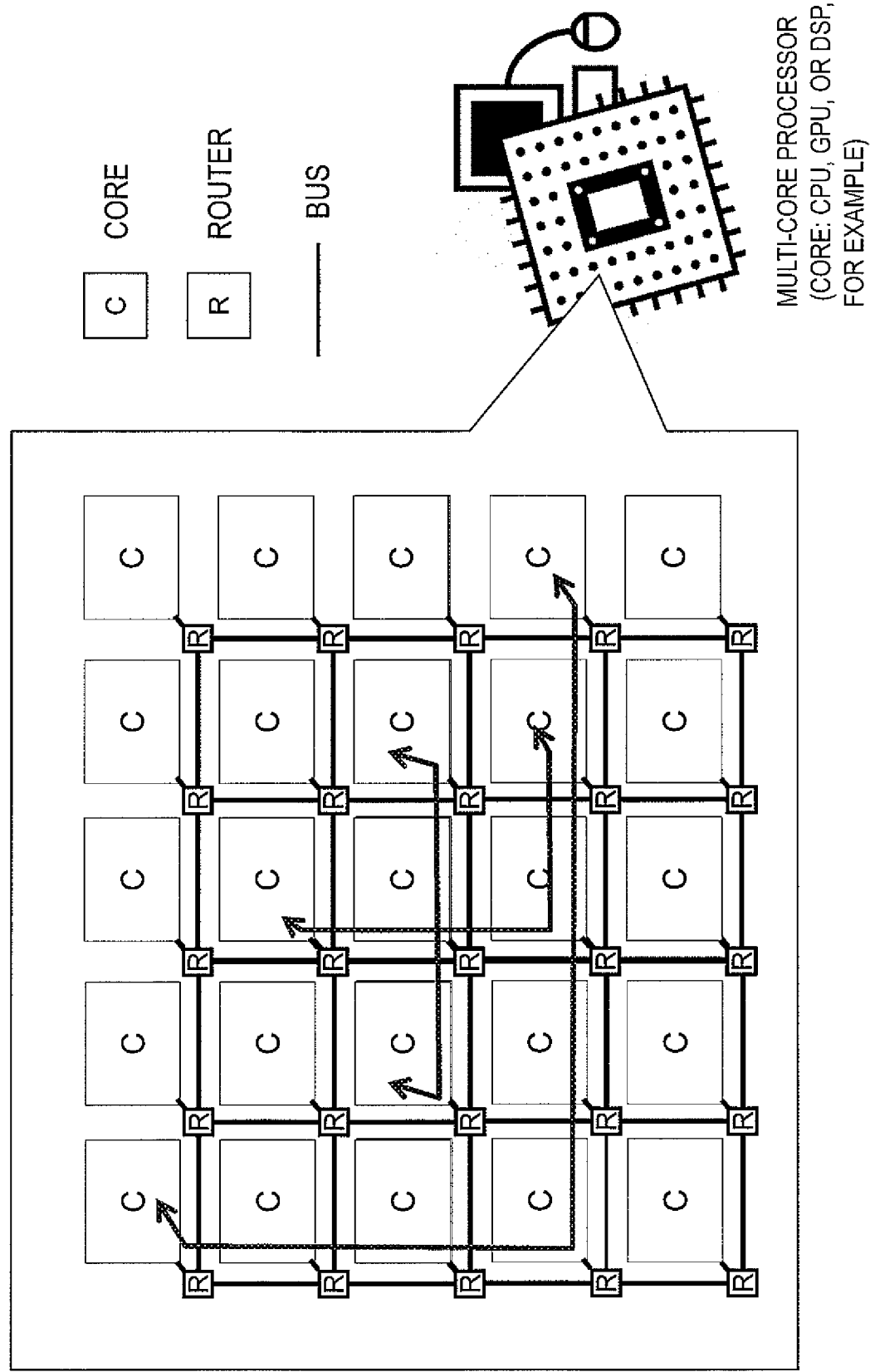

FIG. 32 illustrates an example in which a router according to an embodiment of the present disclosure is used on a multi-core processor.

DETAILED DESCRIPTION

First of all, the problems that the present inventors considered will be described. After that, a router as an exemplary embodiment of the present disclosure will be described with reference to the accompanying drawings.

FIG. 5 illustrates one of the problems that the present inventors considered.

FIG. 5 illustrates a situation where Masters A and B are connected to the same memory via Routers A and B on a NoC and each have transmitted a packet to that memory.

Each of Routers A and B is supposed to have two input ports and two output ports, and each of those input ports is supposed to have four virtual channels (VCs).

If packets are being transmitted from the eight virtual channels of Router A to Router B, the number of the Router B's virtual channels available for Router A is four. Thus, not all of the eight virtual channels of Router A can secure the virtual channels of Router B at the same time. That is why without identifying the transmission node of any given packet, the virtual channels of the adjacent router are allocated according to the order in which the packets arrived at Router A, the order of the deadlines by which the packets are supposed to arrive at the destination node, and the priorities given to those packets, for example. As a result, in some cases, each and every virtual channel of Router B could be occupied by the packets that have come from the same transmission node.

For example, if Router B's virtual channels are allocated to only Router A's virtual channels that store the packets that have come from Master A, then the number of Router B's virtual channels available becomes insufficient. In such a situation, Router A cannot transmit the packets that have come from Master B, and therefore, the transmission schedule cannot be adjusted by switch allocation (SA) with respect to the packets coming from Masters A and B that are two different transmission nodes. As a result, it becomes difficult to transmit the packets with appropriate transmission performance maintained with respect to each transmission node.

For that reason, to allow the router to arrange the transmission schedule appropriately by switch allocation (SA), one or more virtual channels (VCs) need to be allocated to each of the packets coming from two or more different transmission nodes.

A general network which uses parallel computers or an ATM carries out best effort type telecommunications and permits some delay. Also, in that case, the restriction on the size of transmission buffers (virtual channels) is less strict than in a NoC on a semiconductor integrated circuit. Furthermore, even if packets headed to the same destination have been transmitted consecutively, such a situation where every virtual channel of a router is occupied by the packets that have come from the same transmission node rarely arises. Also, even if such a situation should arise, the packet time delay permitted by parallel computers or ATM is still longer than the duration of such occupancy, thus affecting the transmission performance just a little.

The NoC telecommunications, on the other hand, should be a real time one in many cases, and are subject to a lot of delay-related restrictions (e.g., a delay is not permitted in some cases). On top of that, since the router is implemented on a semiconductor integrated circuit in a NoC, a lot of restrictions are imposed on the number and size of virtual channels and virtual channels in a router will often run short. As a result, the time delay involved until the virtual channels in question are opened up will affect the transmission performance significantly.

The present inventors perfected our invention in order to overcome such a problem.

Embodiments of the present disclosure are outlined as follows:

A router according to an embodiment of the present disclosure relays a packet to be transmitted from one node to another in an integrated circuit that has distributed buses according to a packet exchange method. The router includes: a plurality of buffers, each of which configured to store packets with information indicating their transmission node; a classifying section configured to classify the buffers that store the packets into a number of groups according to the transmission nodes of the packets; a selecting section configured to select at least one of the buffers of each group; and an output port configured to sequentially output the packets that are stored in the selected buffer.

In one embodiment, time information is added to the packet. If two or more buffers belong to any of the groups of buffers classified, the selecting section selects, by reference to the time information of the packets that are stored in the respective buffers, one of the two or more buffers as a buffer with the top priority. On the other hand, if only one buffer belongs to any of the groups of buffers classified, then the selecting section selects the only one buffer as a buffer with the top priority.

In this particular embodiment, the output port outputs the respective packets that are stored in the buffer with the top priority in each group in an order which is determined by reference to the time information of the respective packets.

In a specific embodiment, the time information is a deadline by which a packet is supposed to arrive at its destination node, and the output port outputs the respective packets that are stored in the buffer with the top priority in each group in such an order that a packet with the earliest deadline is output earlier than any other packet.

In an alternative embodiment, the time information is a transmission time when a packet was transmitted from a source node, and the output port outputs the respective packets that are stored in the buffer with the top priority in each group in such an order that a packet with the earliest transmission time is output earlier than any other packet.

In still another embodiment, the router further includes: a measuring section configured to measure, on a transmission node basis, an index indicating the degree of traffic flow congestion of the packets so that the greater the degree of congestion, the larger the index measured by the measuring section; and a determining section configured to determine the number of packets output so that the larger the index of a transmission node, the larger the number of packets to be output through the output port.

In this particular embodiment, the measuring section measures the number of the buffers that have been classified by the classifying section as the index indicating the degree of traffic flow congestion of the packets.

In an alternative embodiment, the measuring section measures a passage time that it takes for a packet that has arrived at its own router to leave the router as the index indicating the degree of traffic flow congestion of the packets.

In another alternative embodiment, the measuring section measures the bus bandwidth usage as the index indicating the degree of traffic flow congestion of the packets.

In yet another embodiment, the transmission node is either a single bus master or a set of multiple bus masters. The classifying section classifies the buffers into multiple groups according to the single bus master, the set of bus masters, or one or multiple routers that the packet has passed through on a transmission route.

In this particular embodiment, the classifying section classifies the buffers that store the packets into multiple groups according to the router(s) that the packets have passed through on the transmission route.

In another embodiment, there are multiple transmission nodes, which have been classified in advance so that each transmission node belongs to any of multiple groups. And the classifying section classifies, according to the group to which a transmission node that has transmitted the packets belongs, the multiple buffers that store the packets into a number of groups.

Embodiment 1

Figure 1:
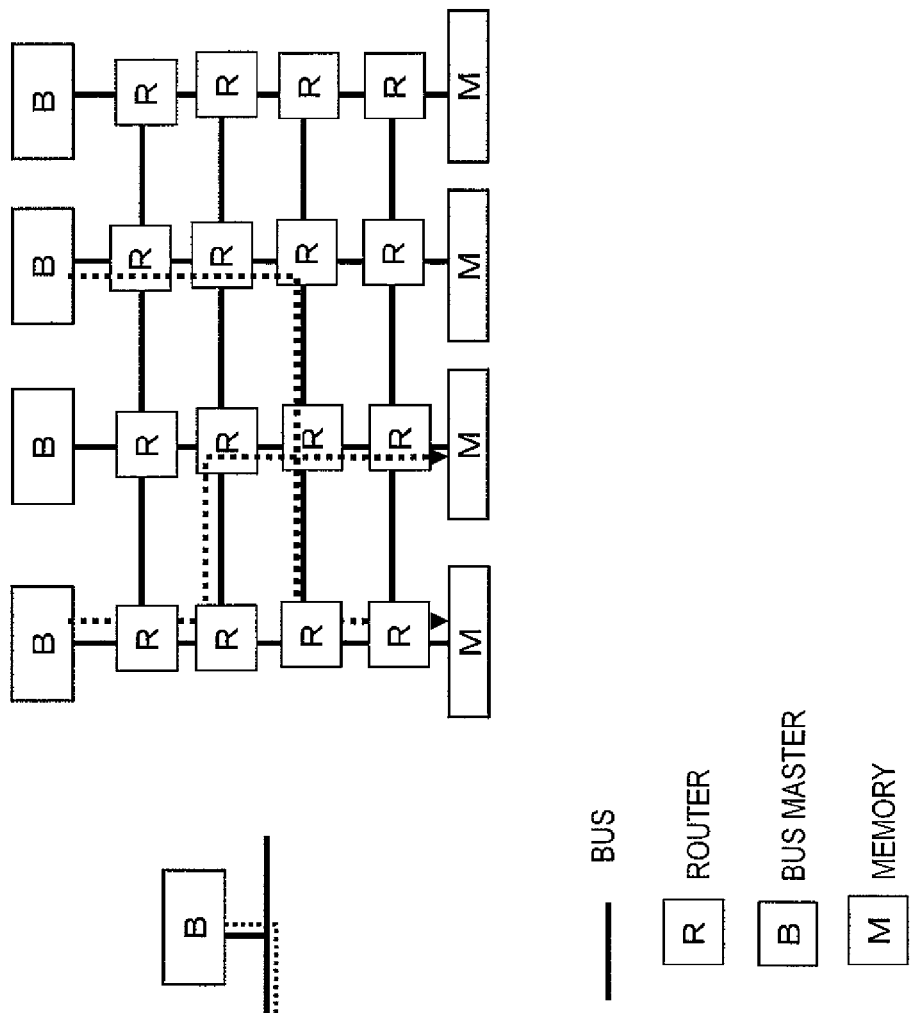
Figure 2:
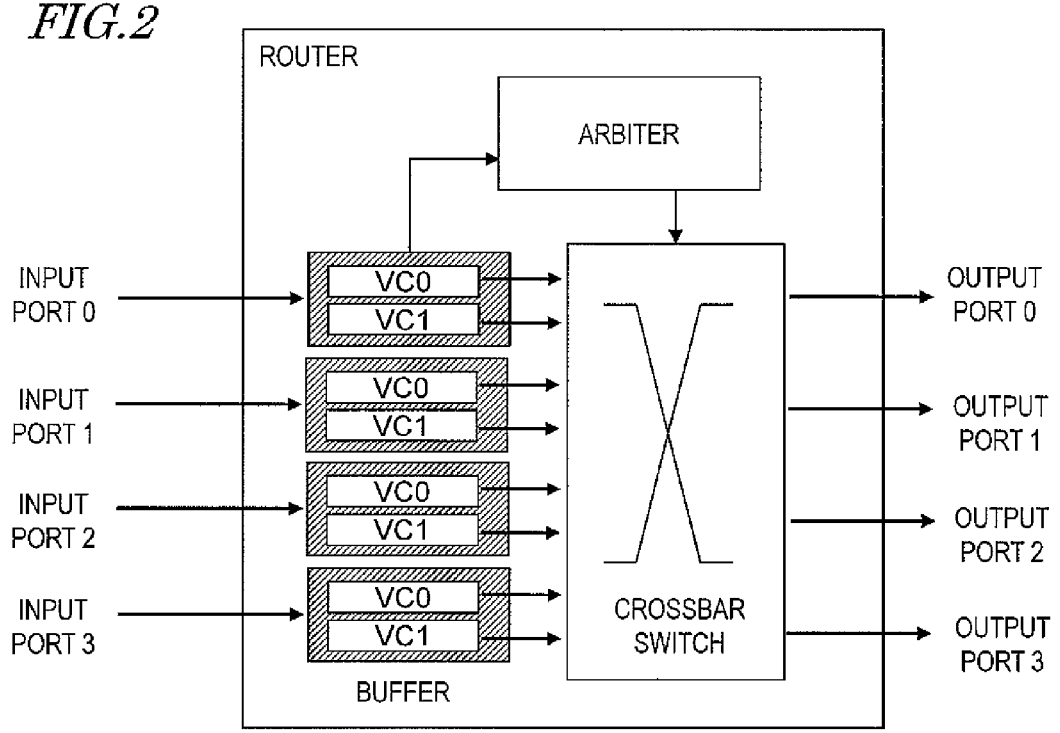
FIG. 2 illustrates generally a basic configuration for a router.
Figure 3:
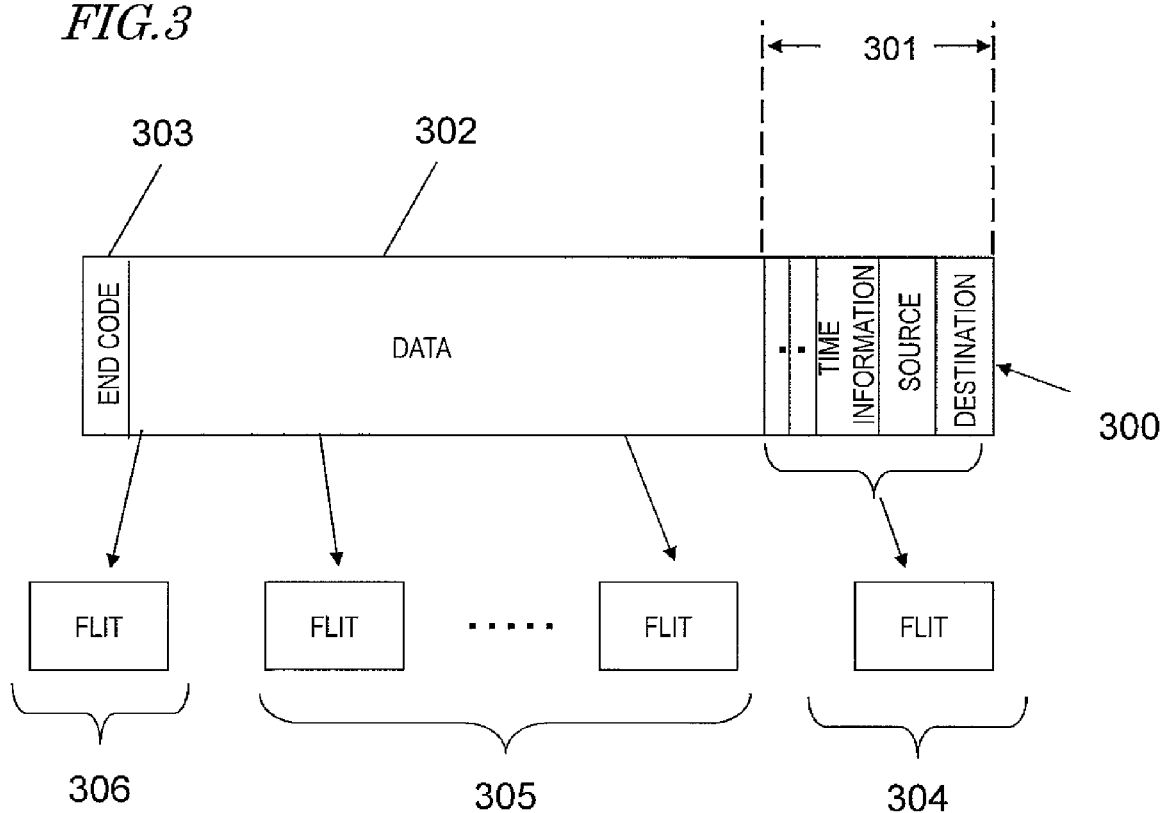
FIG. 3 illustrates an exemplary transmission format for a packet 300 and how the packet 300 may be divided into multiple flits.
Figure 4A:
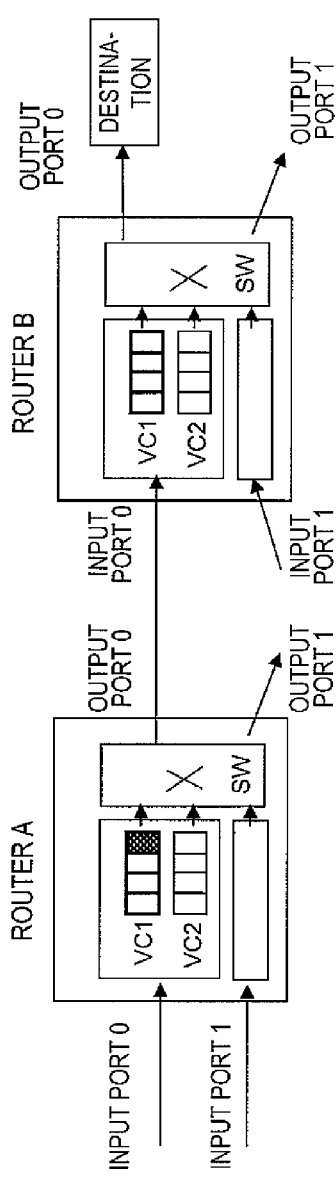
FIG. 4A is a flowchart showing a series of processing operations to be performed by each router in a NoC in order to transmit a packet that has been received by the router to either an adjacent router or a reception node.
Figure 4B:
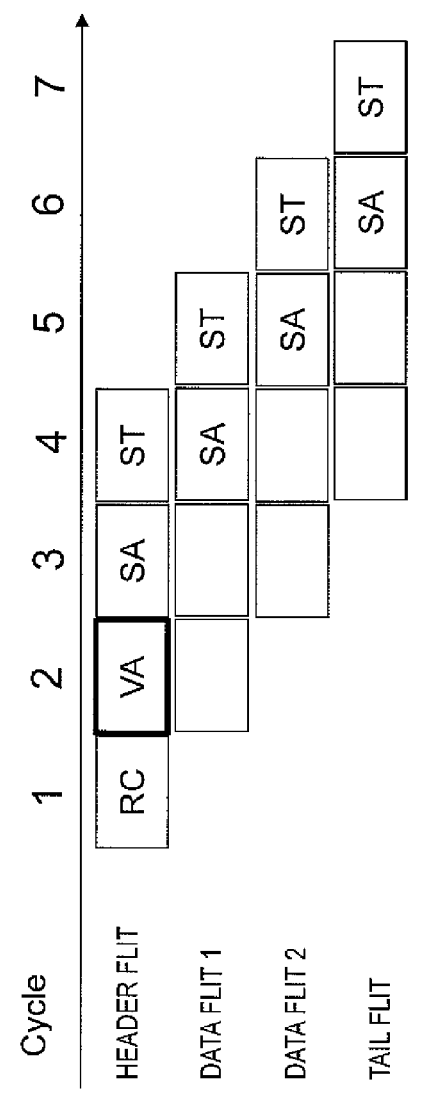
FIG. 4B illustrates a configuration for virtual channels of routers which contribute to transmitting the flits as shown in FIG. 4A.
Figure 4C:
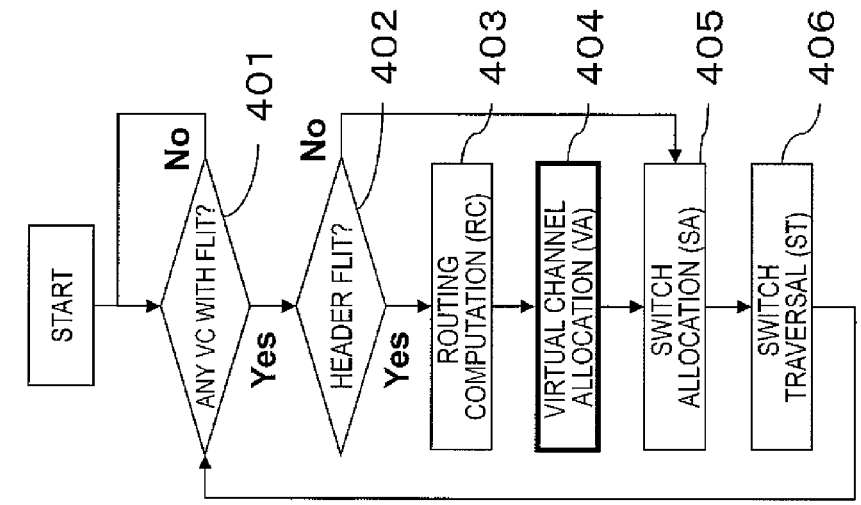
FIG. 4C shows how Router A shown in FIG. 4B relays one packet.
Figure 6:
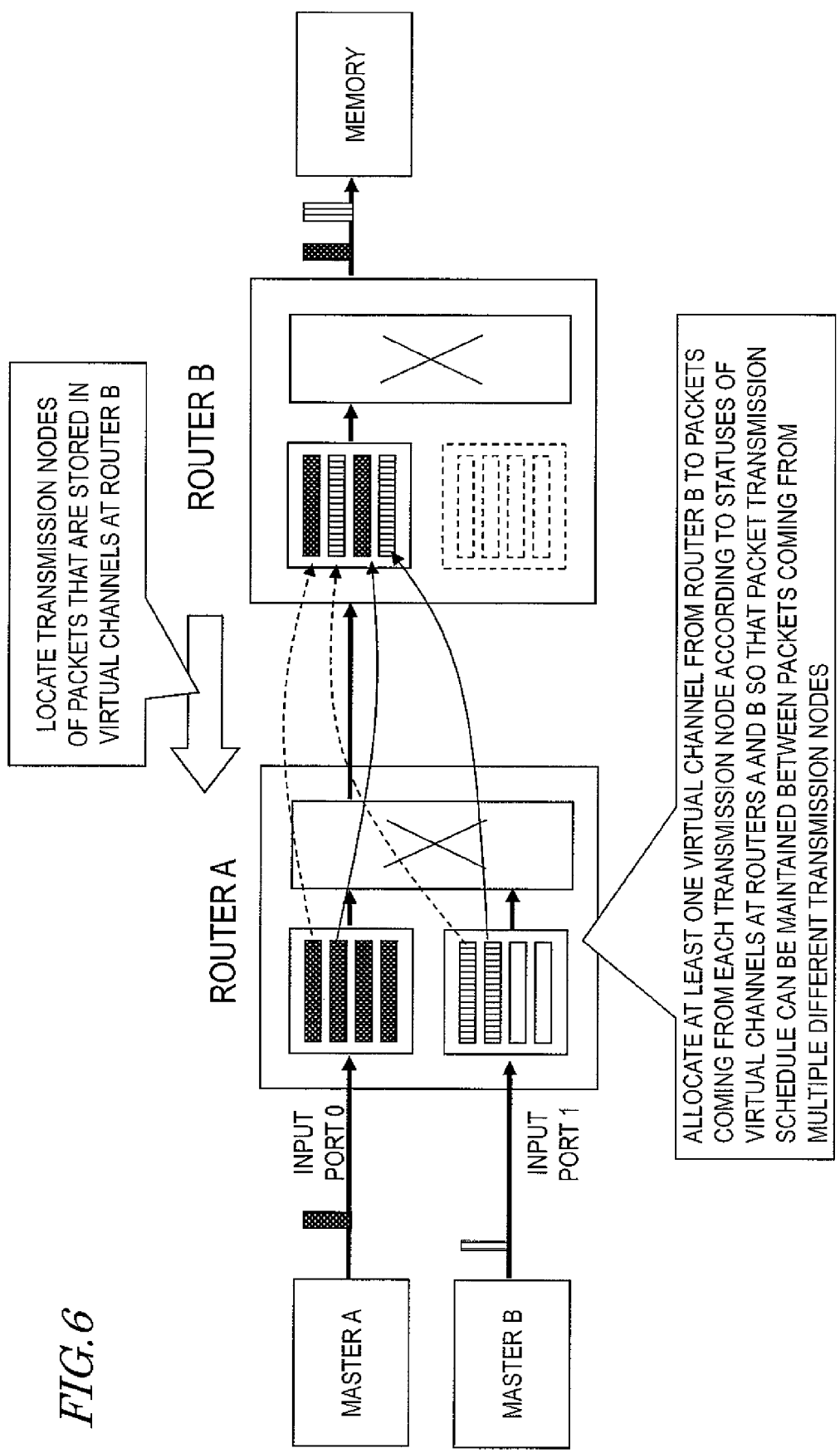
FIG. 6 illustrates generally how a router according to a first exemplary embodiment operates.

FIG. 6 illustrates generally how a router according to this embodiment operates. Masters A and B are connected to the same memory via Routers A and B on a NoC and each have transmitted a packet to that memory.

Each of Routers A and B is supposed to have two input ports and two output ports, and each of those input ports is supposed to have four virtual channels (VCs).

In carrying out virtual channel allocation (VA), a router according to this embodiment locates the transmission node of a packet to be transmitted from a virtual channel that has already been allocated. And if the packets (or flits) received have come from multiple transmission nodes, at least one of the virtual channels at an adjacent router is allocated to each virtual channel that stores the packet (or flits) that has come from one of the multiple transmission nodes. In other words, one or more virtual channels of the router is allocated to each source so as to prevent the packets that have come from a particular transmission node from occupying all virtual channels of the adjacent router and to transmit the packets that have come from every transmission node just as intended according to the transmission schedule.

For instance, in the example illustrated in FIG. 6, Router A according to an embodiment of the present disclosure locates the transmission nodes of the packets, to which virtual channels have been allocated in Router B, and carries out the virtual channel allocation (VA) so that the number of Router B's virtual channels to allocate becomes the same as the number of Router A's virtual channels that store the respective packets that have come from Masters A and B. Router A allocates one or more of the Router B's virtual channels to each of its own virtual channels that store the packets that have come from Masters A and B. As a result, the transmission schedule can be adjusted by turning the crossbar switch (i.e., by performing the switch allocation) and the band control that meets the individual masters' requests can be maintained.

Figure 7:
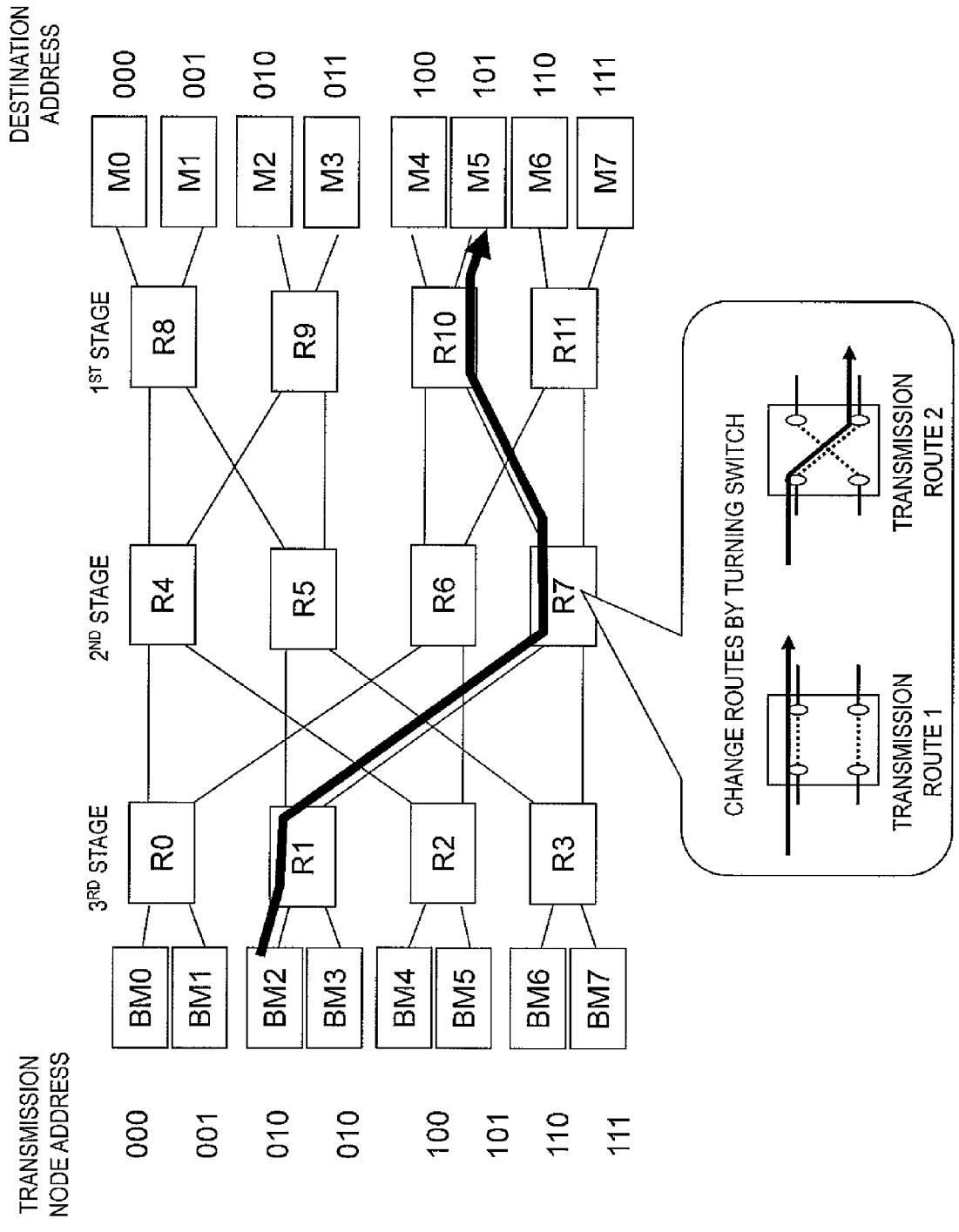
FIG. 7 illustrates an arrangement of distributed buses which are supposed to be used in the first exemplary embodiment.

FIG. 7 illustrates an arrangement of distributed buses which are supposed to be used in this embodiment.

In this embodiment, an architecture in which multiple bus masters BM as transmission nodes and multiple memories M as reception nodes are connected together via multiple routers R (and which is called a "multistage interconnection network (MIN)") will be described as an example. Each of those routers is supposed to have two inputs and two outputs.

More specifically, in the circuit illustrated in FIG. 7, eight bus masters BM0 through BM7, twelve routers R0 through R11, and eight memories M0 through M7 are connected together with buses. The three-digit numerals shown at the left end of FIG. 7 indicate the respective addresses of the bus masters (transmission nodes). On the other hand, the three-digit numerals shown at the right end of FIG. 7 indicate the respective addresses of the memories (destination nodes).

Those twelve routers are classified into three groups, each of which consists of four routers. Specifically, one of the three is a group consisting of R0, R1, R2 and R3 that are connected to the eight bus masters, another one is a group consisting of R8, R9, R10 and R11 that are connected to the eight memories, and the other is a group consisting of R4, R5, R6 and R7 that interconnect the routers connected to the bus masters and the routers connected to the memories together.

Each of those routers that form parts of this multistage interconnection network includes a crossbar switch with two inputs and two outputs. By changing the input and output combinations with the crossbar switch turned, each router can change the transmission route of packets. It should be noted that a single router can output flits through two transmission routes at the same time if the transmission routes lead to two different output ports.

In this multistage interconnection network, by turning the switch at each router, one or more transmission routes can always be formed between every bus master and every memory.

In general, to connect every one of N bus masters and every one of M memories together with crossbar switches, N×M switches are needed. In that case, the greater the number of bus masters or memories, the more steeply the number of switches needed rises. On the other hand, such a multistage interconnection network (MIN) is characterized by connecting crossbar switches with a small number of inputs and outputs in a hierarchical pattern so that the connection between the bus masters and memories can be changed with a much smaller number of switches.

Although such a multistage interconnection network is supposed to be used in this embodiment, this is only an example of the present disclosure. Thus, the technique described above is naturally applicable to even an integrated circuit that has a different topology. Also, according to this embodiment, data is supposed to be transferred from a bus master to a memory by packet exchange method by way of multiple routers.

Also, a flit that has been received at each router can be transmitted to either a router leading to the target route or a destination node by turning the switch.

In the example illustrated in FIG. 7, flits are supposed to be transmitted from a bus master to a memory. However, this is just an example of the present disclosure. Rather the destination of the flits does not have to be a memory but may also be another bus master or an input/output interface to be connected to a peripheral device.

Figure 8:
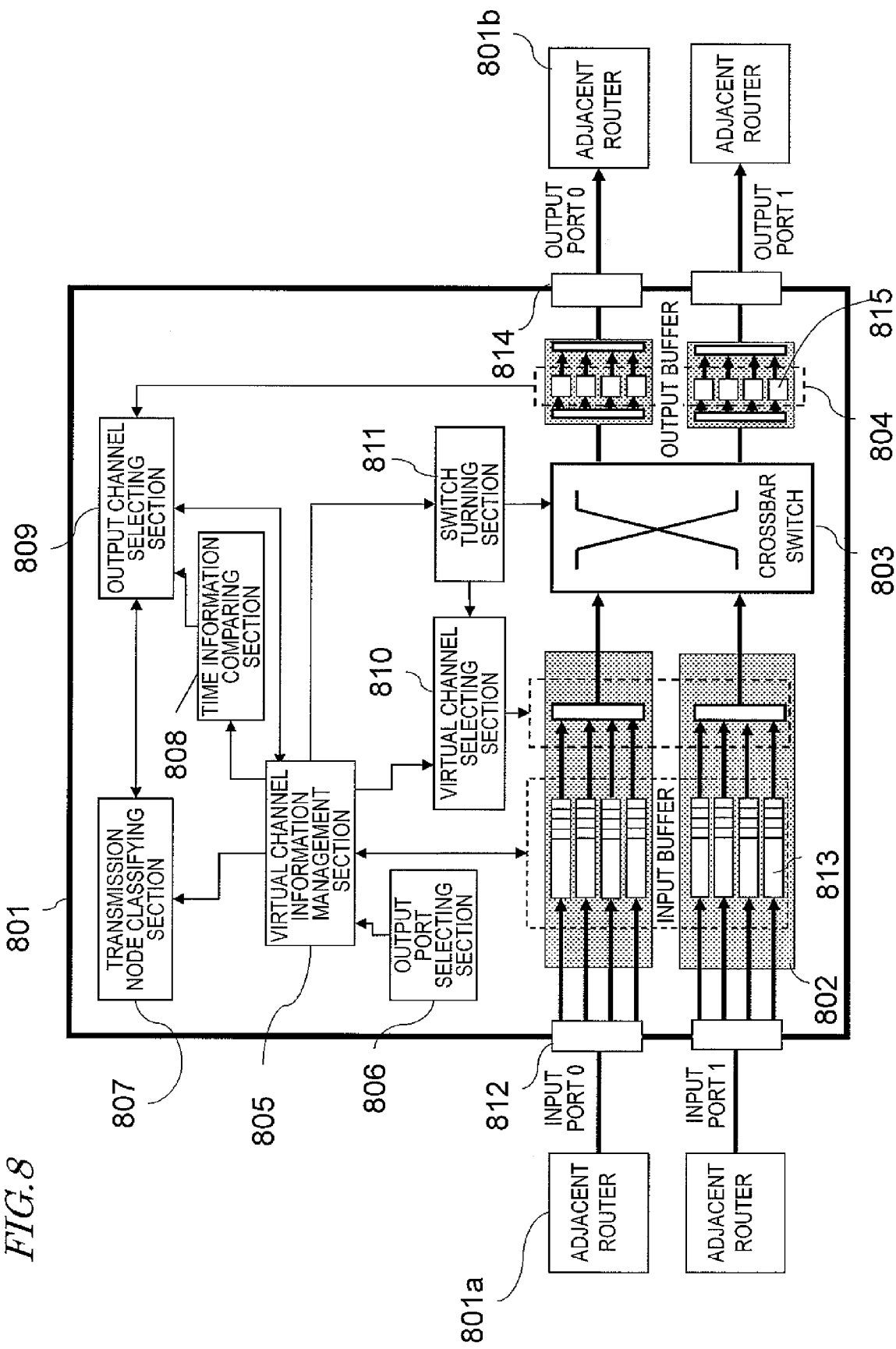
FIG. 8 illustrates a configuration for a router 1201 according to the first exemplary embodiment.

FIG. 8 illustrates a configuration for a router 801 according to this embodiment.

The router 801 includes input buffers 802, a switch 803, output buffers 804, a virtual channel information management section 805, an output channel selecting section 806, a transmission node classifying section 807, a time information comparing section 808, an output channel selecting section 809, a virtual channel selecting section 810 and a switch turning section 811.

Hereinafter, the functions of these components will be described one by one.

Each input port 812 receives flits that have been transmitted from either an adjacent router or another transmission node (such as one of BM0 through BM7 shown in FIG. 7).

Each input buffer 802 is a buffer that accumulates the flits that have been transmitted from an adjacent router 801a (or a transmission node) on the input port side.

One temporary buffer functioning as the input buffer 802 may be provided for each input port of the router 801. Or multiple virtual channels 813 may be provided for each input port so that the transmission schedule can be controlled by using respective channels for different packets. In this embodiment, four virtual channels 813 are supposed to be provided for each input buffer 812 as shown in FIG. 8.

The crossbar switch 803 is a switch for changing exclusive connections between the input and output ports 812 and 814 of the router 801.

Each output buffer 804 is a temporary buffer to be used when flits are transmitted to a group of routers 801b that are connected to the output ports 814 to be described later.

Each output buffer 804 further has multiple output channels 815. The output channels 815 provided need to be as many as the virtual channels of the input buffers in the routers 801b, which are connected to the output buffers 804 through the output ports 814. And a one-to-one correspondence is defined between those output channels 815 and the virtual channels of the group of adjacent routers 801b.

Each output port 814 transmits flits from this router 801 to either an adjacent router 801b or a reception node.

The flits that have been transmitted from this router 801 through one of those output channels are accumulated in a virtual channel of an associated one of those routers 801b, which is connected to the output port 814 provided for that output channel. That is to say, by selecting an output channel 815 for transmitting the flits, this router 801 can designate in which of the virtual channels of the router 801b that is connected to the output port 814 the flits transmitted should be stored.

The virtual channel information management section 805 manages flit information to be stored in each virtual channel 813. Detailed contents of the information managed by the virtual channel information management section 805 will be described later with reference to FIG. 9.

When the input buffer 814 newly receives a header flit, the output port selecting section 806 selects, by reference to the destination information described in the header flit, an output port that is connected to the router 801b to which the flit should be passed next.

The transmission node classifying section 807 classifies the virtual channels into multiple groups according to the transmission nodes of packets that are stored in those virtual channels.

The time information comparing section 808 compares to each other the priorities based on the time information that has been given to the respective packets stored in those virtual channels 813, thereby ranking those virtual channels according to priority in channel allocation.

According to this embodiment, the time information given to each of those packets is supposed to be the deadline by which the packet is supposed to arrive at the destination node. Also, as for the priority based on the time information, the earlier the deadline by which a packet should arrive at the destination node, the higher its priority is supposed to be.

In accordance with the result of classification that has been done on a transmission node basis by the transmission node classifying section 807 and the result of deadline comparison that has been made by the time information comparing section 808 with respect to those flits that are stored in the respective virtual channels 813, the output channel selecting section 809 selects unallocated output channels 815 in the output buffers 804.

The virtual channel selecting section 810 selects, on an input port (812) basis, one of multiple virtual channels 813 as a candidate virtual channel for transmitting the flits.

The switch turning section 811 turns the crossbar switch 803, thereby determining an exclusive connection between the virtual channel that has been selected by the virtual channel selecting section 810 and its associated output port 814.

In this description, the input ports 812, the input buffers 802 and the virtual channels 813, which contribute to the processing of storing flits that has been received by this router 801 on the virtual channels, will be collectively referred to herein as an "input section". On the other hand, the crossbar switch 803, the virtual channel selecting section 810, the switch turning section 811, the output buffers 804, the output channels 815, and the output ports 814, which contribute to the processing of outputting those flits that are stored in the virtual channels from this router 801, will be collectively referred to herein as an "output section".

FIG. 9 shows an example of virtual channel information 901 to be managed by, and stored in, the virtual channel information management section 805.

In order to identify each virtual channel, the virtual channel information 901 includes an input port identification number and a virtual channel identification number. Furthermore, when a packet is stored on a virtual channel, managed are address information to locate the transmission node of that packet, address information to locate the destination of that packet, time information for use to arrange the transmission schedule of the packet (such as the deadline by which the packet should arrive at its destination), and the respective numbers of an output port and an output channel to deliver the packet to the destination. It should be noted that the time information does not have to be the deadline but may also be a packet transmitted time, for example.

Also, the output channel number corresponds to the number of the virtual channel of the router at the reception node in which a packet that has been transmitted through the output port will be stored.

The router 801 of this embodiment is supposed to have output channels 815 at each output port 814. In a router with no output channels 815, however, the number of the virtual channel for use in the adjacent router 801b is recorded as the output channel number of the virtual channel information 901.

Hereinafter, it will be described with reference to the flowchart shown in FIG. 10 and FIGS. 11 through 18 generally how each router 801 operates by reference to the virtual channel information 901. In FIGS. 11 through 18, any component also shown in FIGS. 8 and 9 and having substantially the same function as its counterpart is identified by the same reference numeral and description thereof will be omitted herein.

Figure 10:
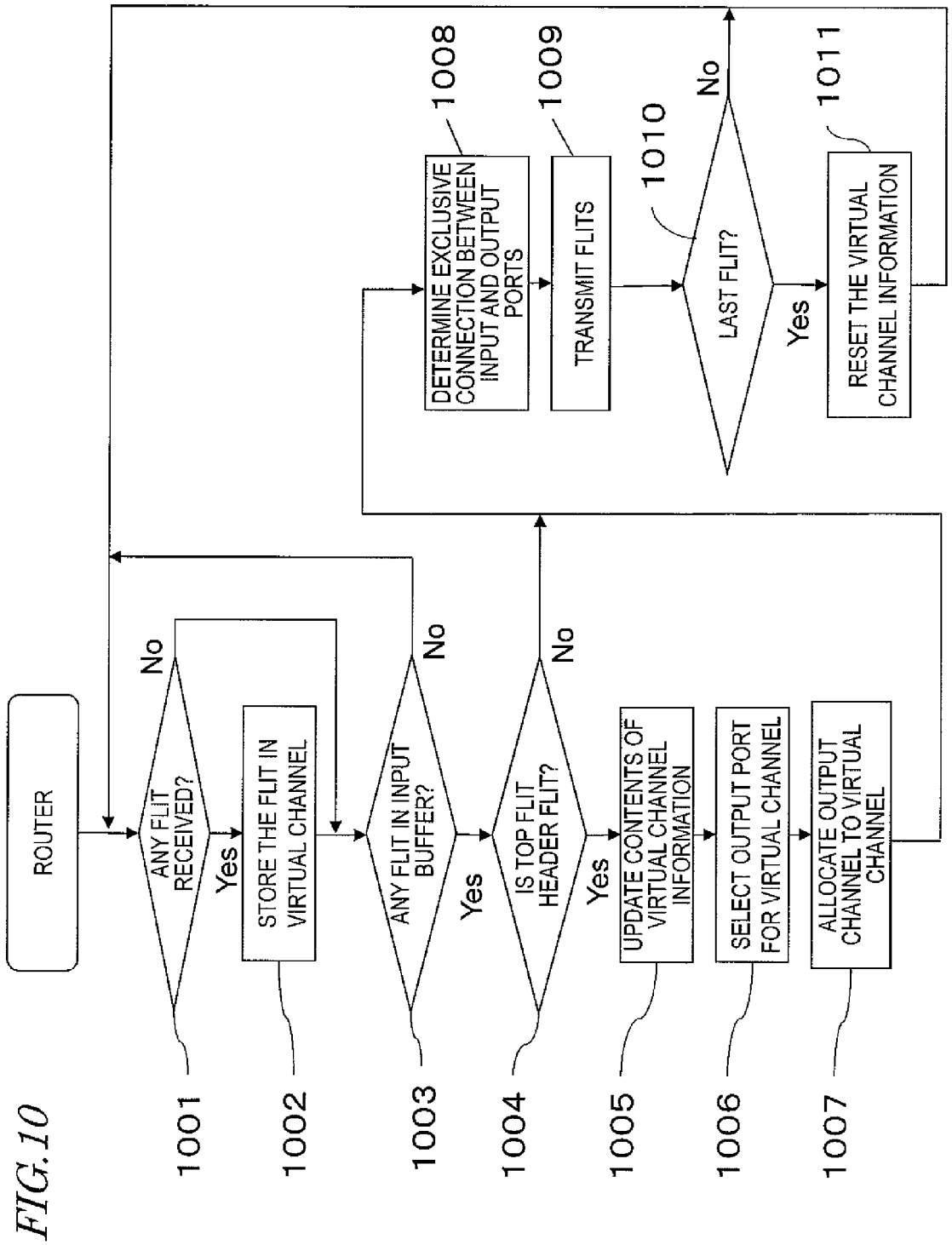
FIG. 10 is a flowchart showing a procedure in which the router 801 operates.

When the NoC circuit is turned ON, the router 801 enters a standby state and gets ready to receive a flit from either an adjacent router 801a or a transmission node through an input port 812. As a result, the processing shown in FIG. 10 is started.

FIG. 11A illustrates how the virtual channels 813 are used or unused in the router 801. On the other hand, FIG. 11B shows the contents of the virtual channel information 901 at a point in time when the router 801 has not received any flit yet at Input Port 0.

In the rest of the description, the virtual channel information 901 about only this Input Port #0 will be described as an example.

Since no flits have arrived yet, every virtual channel is still unused in the state shown in FIG. 11.

In Step 1001 shown in FIG. 10, the input port 812 of the router 801 determines whether or not the router 801 has received any flit yet.

If the answer is YES, the process advances to Step 1002. Otherwise, the process advances to Step 1003.

In Step 1002, the input port 812 stores the received flit on the virtual channel 813. It should be noted that the virtual channel 813 on which the flit should be stored has been determined in advance by either the adjacent router 801a or the transmission node.

In Step 1003, the input buffer 802 determines whether or not there is any flit on each virtual channel 813. If the answer is YES, the process advances to Step 1004. Otherwise, the process goes back to Step 1001.

In Step 1004, the virtual channel 813 in the router 801 determines whether or not the flit stored at the top of the virtual channel 813 is a header flit 304. If the answer is YES, the process advances to Step 1005. Otherwise, the process advances to Step 1008.

FIG. 12A illustrates how the state has changed from the one shown in FIG. 11A when one cycle time passes. As shown in FIG. 12A, the header flit 304 that has arrived at Input Port 0 has just been stored on Virtual Channel 0.

When the header flit 304 arrives at the virtual channel 813, the virtual channel information management section 805 updates the virtual channel information 901 with the information to be used to determine the order of transmission of packets when the router 801 arranges the transmission schedule in Step 1005 shown in FIG. 10. Examples of such information to be used to determine the order of transmission of the packets include the source and destination addresses of the transmission and reception nodes as described in the header flit 304 and the deadline by which the entire packet is supposed to arrive at the destination node.

On the other hand, FIG. 12B shows the contents of the virtual channel information 901 that has been updated with the respective addresses of the transmission and destination nodes and the transmission time information that are described in the header flit 304. In this example, the address "010" of BM2 (see FIG. 7) as the packet's transmission node, the address "101" of the memory 5 (see FIG. 7, too) as the destination, and the deadline "90" (cycles) by which the packet should arrive at the destination node are added to the virtual channel information 901.

FIG. 13A illustrates how the state has changed from the one shown in FIG. 12A when one more cycle time passes. As shown in FIG. 13A, the data flit has also been stored on Virtual Channel 0 after the header flit.

In Step 1006 shown in FIG. 10, the output port selecting section 806 of the router 801 locates the destination of the packet by reference to the virtual channel information 901 that has been updated in Step 1005, and selects an output port 814 through which the packet will be transmitted to that destination.

Hereinafter, an exemplary method for selecting the output port 814 using the multistage interconnection network shown in FIG. 7 will be described. In the multistage interconnection network shown in FIG. 7, an address is assigned as a three-digit binary number to each memory and the destination address at the memory to which a packet should be transmitted is also specified by a three-digit binary number in the header flit of each packet.

The output port selecting section 806 of this first embodiment reads, from left to right, the first, second or third digit of the three-digit address specified in the header flit. In this case, the position of the digit to be read should be the same as that of the stage of a given router. And if the value is zero, the output port selecting section 806 selects Output Port 0 in FIG. 12. On the other hand, if the value is one, the output port selecting section 806 selects Output Port 1 in FIG. 12.

For example, suppose data needs to be transmitted from Bus Master BM2 (with the address "010") to Memory 5 (with the address "101"). In that case, in accordance with the three-digit number specifying the address of Memory 5, first of all, Router R1 transmits the flit to its lower-right Router R7. Next, Router R7 transmits the flit to its upper-right Router R10. And then Router R10 transmits the flit to its lower-right Memory 5. In this manner, the flit can be transmitted from Bus Master BM2 to Memory 5.

It should be noted that as long as a flit can be delivered to its destination appropriately according to the topology of the distributed buses, the output port selecting section 806 may also select an output port by any other method instead of the method described above.

FIG. 13B shows the contents of the virtual channel information 901 at a point in time when the router 801 has allocated an output port 814 to the virtual channels 815. It can be seen from FIG. 13B that Output Port 0 has been selected. As a result, Router 801 is now ready to transmit the packet in Virtual Channel 0 to Output Port 0 leading to Memory 5 as the destination.

FIG. 14A illustrates how the state has changed from the one shown in FIG. 13A when one more cycle time passes. As shown in FIG. 14A, the tail flit 306 has also been stored on Virtual Channel 0 after the header flit 304 and the data flit 305.

In Step 1007 shown in FIG. 10, the transmission node classifying section 807, time information comparing section 808 and output channel selecting section 809 of the router 801 classify, by reference to the virtual channel information management section 805, the packets that are stored on the virtual channels into multiple groups according to transmission node, and finds, on a group by group basis, what virtual channel stores a packet with the earliest deadline, by which the packet should arrive at the destination. Furthermore, if no output channel has been selected yet for any of those virtual channels in question, an output channel is allocated to that virtual channel.

As shown in FIG. 13A, even though Output Port 0 has already been selected, the router 801 has Virtual Channel 0 for which no output channel has been selected yet. Also, there is unused Output Buffer 0 at Output Port 0. Thus, the output channel selecting section 809 allocates Output Channel 0 at Output Port 0 to Virtual Channel 0 at Input Port 0.

FIG. 14B shows the contents of the virtual channel information 901 after the output channel 815 has been selected in the router 801. According to this virtual channel information 901, Output Channel 0 has been selected for Virtual Channel 0.

In the example described above, only one packet is supposed to have arrived at the router 801 that has just been turned ON for the sake of simplicity. However, the processing of allocating output channels 815 to respective virtual channels 813 right after multiple packets have arrived at the router 801 will be described in detail later with reference to FIG. 17.

Figures 15A, 15B:
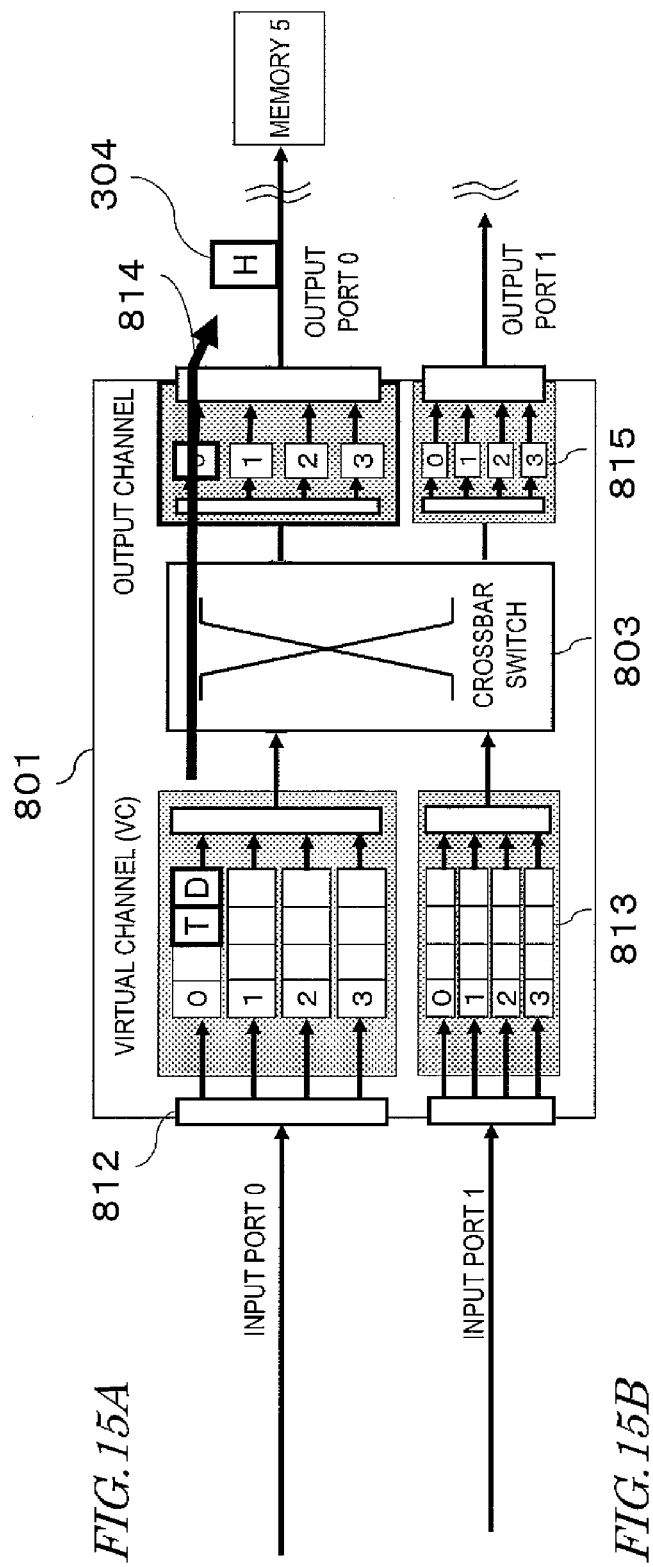
FIG. 15A illustrates how the state of the virtual channel 813 in the router 801 has changed from the one shown in FIG. 14A when one more cycle time passes.
FIG. 15B shows the contents of the virtual channel information 901 at a point in time by which the header flit and the data flit have been transmitted.

FIG. 15A illustrates how the state of the virtual channel 813 in the router 801 has changed from the one shown in FIG. 14A when one more cycle time passes.

In Step 1008 shown in FIG. 10, the virtual channel selecting section 810 of the router 801 selects one of the virtual channels, to which output channels have already been allocated, on an input port (812) basis.

Meanwhile, the switch turning section 811 of the router 801 determines whether or not there is any contention for the same output port between the virtual channels, each of which has been selected for its associated input port 812. If the answer is YES, the switch turning section 811 selects one of those virtual channels that are contending with each other for the same output port.

Consequently, one virtual channel 813 that transmits the flit is selected for each output port 814. And based on that result, the switch turning section 811 turns the crossbar switch 803 so as to connect the input port 812 including the virtual channel 813 selected to its associated output port 814.

When the crossbar switch is turned, each of the virtual channels 813 that have been selected by the virtual channel selecting section 810 and the switch turning section 811 transmits a flit in Step 1009.

FIG. 15B shows the contents of the virtual channel information 901 at a point in time by which the header flit and the data flit have been transmitted. At this point in time, the tail flit has not been transmitted yet.

FIG. 16A illustrates the status of the respective virtual channels 813 at a point in time by which the tail flit has been transmitted from the router 801.

Then, in Step 1010 shown in FIG. 10, the virtual channel 813 determines whether or not the flit being transmitted is the last one of the flits that form the given packet.

If it has turned out in Step 1011 shown in FIG. 10 that the flit being transmitted is the last one of the flits that form the given packet, then the virtual channel that has been occupied needs to be freed so that a different packet can use that virtual channel. In that case, the virtual channel information management section 805 resets the information about the virtual channel 813 that has transmitted the tail flit.

FIG. 16B shows the contents of the virtual channel information 901 at a point in time by which the tail flit 306 has been transmitted. As the tail flit has already been transmitted from Virtual Channel 0 at Input Port 0, the virtual channel information management section 805 resets information about Virtual Channel 0 at Input Port 0.

By performing this series of processing steps 1001 through 1011*a* number of times, the router 801 can relay the packets received to their destinations.

Figure 17:
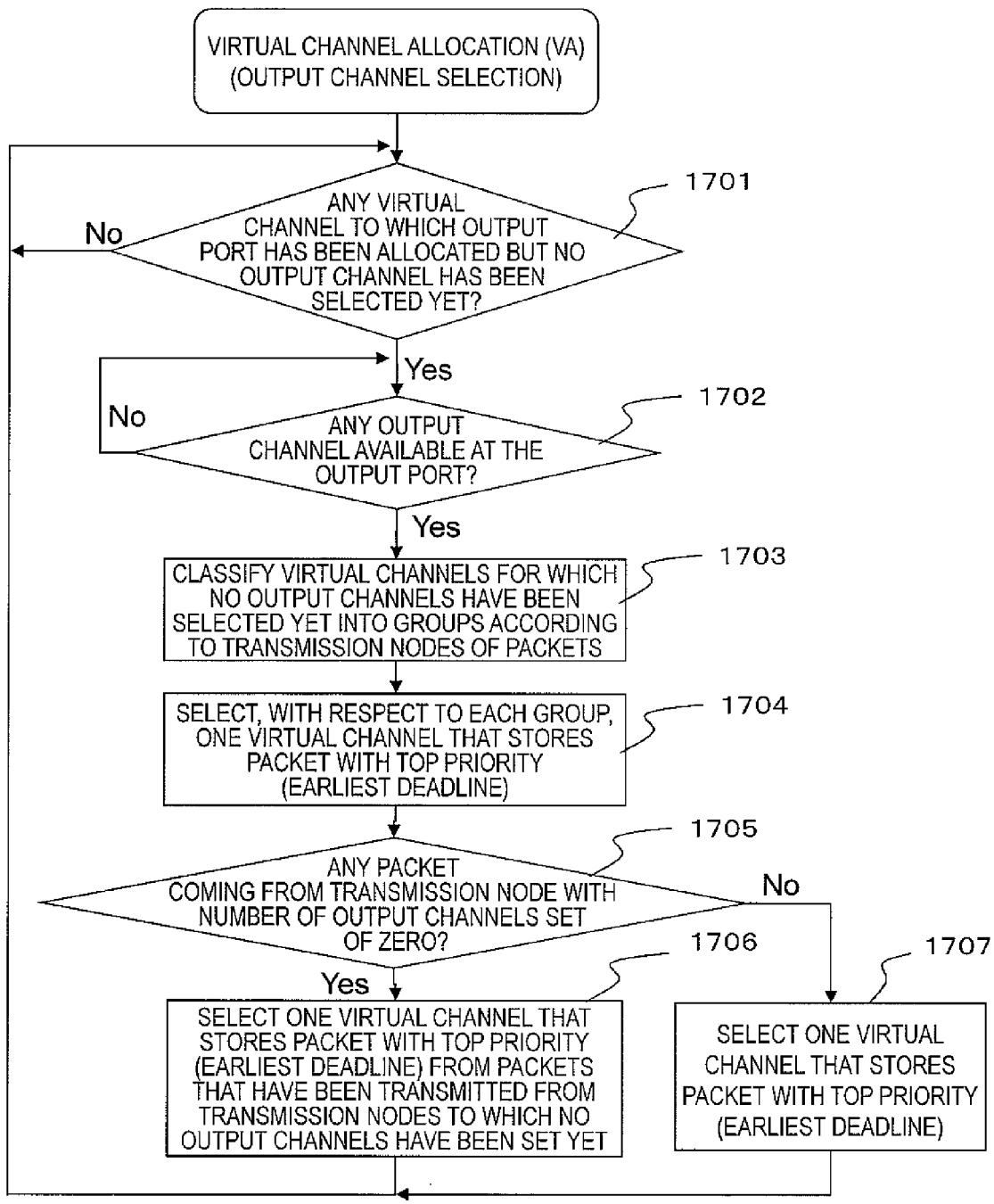
FIG. 17 is a flowchart showing the procedure in which the output channel selecting section 809 allocates output channels 815 to virtual channels 813 (i.e., the virtual channel allocation processing) in Step 1007 shown in FIG. 10.

FIG. 17 is a flowchart showing the procedure in which the output channel selecting section 809 allocates output channels 815 to virtual channels 813 (i.e., the virtual channel allocation processing) in Step 1007 shown in FIG. 10.

Figures 18A, 18B:
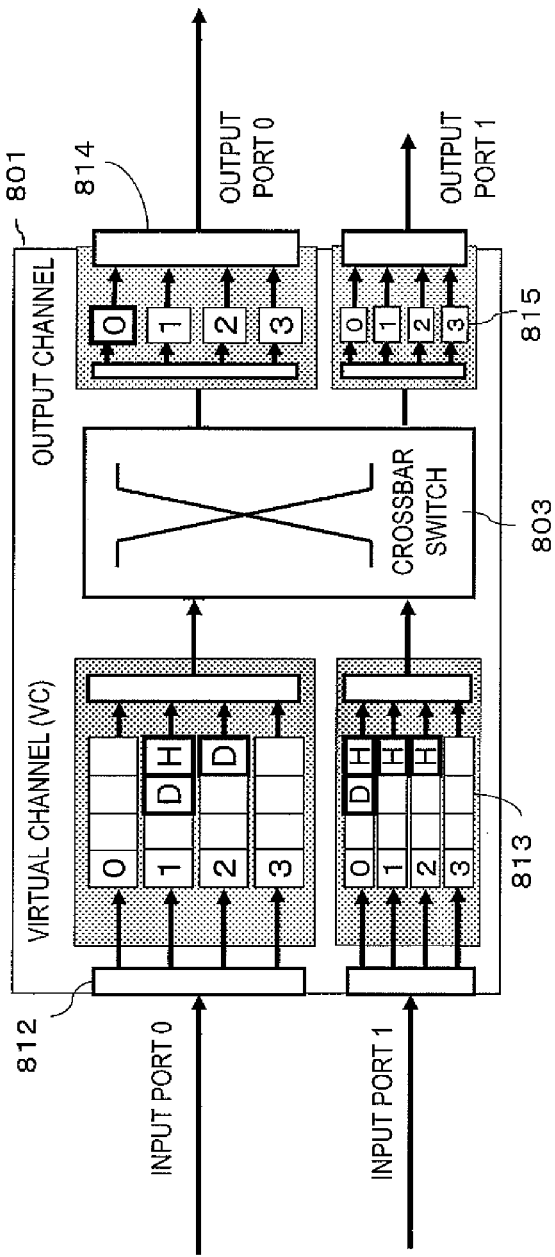
FIG. 18A illustrates the statuses of the respective virtual channels 813 in a situation where multiple packets have arrived at the router 801 at the same time.
FIG. 18B shows the contents of the virtual channel information 901 when the virtual channels 813 have the statuses shown in FIG. 18A.

FIG. 18A illustrates the statuses of the respective virtual channels 813 in a situation where multiple packets have arrived at the router 801 at the same time. The router 801 may receive consecutively flits that form the same packet. However, in some cases, flits that belong to multiple different packets may arrive at the router 801 in combination. On the other hand, FIG. 18B shows the contents of the virtual channel information 901 when the virtual channels 813 have the statuses shown in FIG. 18A.

As shown in FIGS. 18A and 18B, a packet which has come from the transmission node "010" and which should be delivered to the destination "000" has arrived at Virtual Channel 1 at Input Port 0 of this router 801. And one header flit and one data flit that belong to the packet with a deadline of 140 cycles are stored in this Virtual Channel 1, to which Output Port 0 has already been allocated but no output channel has been selected yet.

On the other hand, a packet which has come from the transmission node "010" and which should be delivered to the destination "000" has also arrived at Virtual Channel 2 at Input Port 0 of this router 801. And one data flit that belongs to the packet with a deadline of 105 cycles is stored in this Virtual Channel 2, to which Output Port 0 and Output Channel 0 have already been allocated.

Meanwhile, a packet which has come from the transmission node "111" and which should be delivered to the destination "010" has arrived at Virtual Channel 0 at Input Port 1 of this router 801. And one header flit and one data flit that belong to the packet with a deadline of 125 cycles are stored in this Virtual Channel 0, to which Output Port 0 has already been allocated.

A packet which has come from the transmission node "110" and which should be delivered to the destination "011" has arrived at Virtual Channel 1 at Input Port 1 of this router 801. And one header flit that belongs to the packet with a deadline of 130 cycles is stored in this Virtual Channel 1, to which Output Port 0 has already been allocated.

A packet which has come from the transmission node "111" and which should be delivered to the destination "010" has arrived at Virtual Channel 2 at Input Port 1 of this router 801. And one header flit that belongs to the packet with a deadline of 118 cycles is stored in this Virtual Channel 2, to which Output Port 0 has already been allocated.

Hereinafter, it will be described in detail with reference to FIG. 17 exactly how to allocate output channels to the virtual channels of the router 801 which are in the statuses shown in FIG. 18 as an example.

First of all, in Step 1701, the output channel selecting section 809 determines whether or not there is any virtual channel 813 to which an output port has already been allocated but no output channel has been selected yet. If the answer is NO, then this processing step 1701 is performed all over again. On the other hand, if the answer is YES, the process advances to Step 1702.

In Step 1702, the virtual channel 813 determines whether or not there is any output channel 815 available at the output port 814. If the answer is NO, then this processing step 1702 is performed all over again. On the other hand, if the answer is YES, the process advances to Step 1703.

In Step 1703, the transmission node classifying section 807 classifies the virtual channels, for which no output channels have been selected yet, into multiple groups according to the transmission nodes of the packets.

FIG. 19 shows exemplary results of the virtual channel classification that has been done by the transmission node classifying section 807 in a situation where the virtual channels 813 of the router 801 are in the statuses shown in FIG. 18B. That is to say, FIG. 19 shows the groups of virtual channels that have been classified according to their transmission nodes.

As shown in FIG. 18B, flits that have come from three different transmission nodes (of which the addresses are "010", "110" and "111", respectively) are stored in the virtual channels 813. Thus, these virtual channels are classified into three groups according to their transmission nodes (i.e., according to their source addresses). Specifically, Virtual Channel 1 at Input Port 0 is classified into the group associated with the transmission node address "010". Virtual Channel 1 at Input Port 1 is classified into the group associated with the transmission node address "110". And Virtual Channels 0 and 3 at Input Port 1 are classified into the group associated with the transmission node address "111".

It should be noted that the "number of output channels set" shown at the bottom of FIG. 19 indicates the number of virtual channels to which an output channel number has already been set. In the example illustrated in FIG. 18B, an output channel number had already been set with respect to Virtual Channel 2, but no output channel numbers have been set yet with respect to the other virtual channels. That is why if the virtual channels are classified according to their source addresses, only the source box with address "010" is filled with "1" but the other source boxes are filled with "0".

Next, in Step 1704, the time information comparing section 808 refers to the deadlines that are described in the virtual channel information 901 and selects, with respect to each group of virtual channels that have been classified according to their transmission node addresses, one virtual channel that stores a packet with the earliest deadline as Priority #1. In this processing step, virtual channels to which output channels have already been allocated are excluded from the objects of this prioritization.

In FIG. 19, in the group associated with the transmission node address "010", Virtual Channel 1 at Input Port 0 is given the top priority. In the group associated with the transmission node address "110", Virtual Channel 1 at Input Port 1 is given the top priority. And in the group associated with the transmission node address "111", Virtual Channel 0 at Input Port 1 is given the top priority.

By performing this processing step 1704, the output channel selecting section 809 can allocate one or more output channels to every transmission node. It should be noted that if output channels have already been allocated to every virtual channel with respect to any transmission node, that transmission node is excluded from this prioritization to be done by such processing.

Next, in Step 1705, the decision is made whether or not there is any packet that has come from a transmission node with a number of output channels set of zero. If the answer is YES, the process advances to Step 1706. Otherwise, the process advances to Step 1707.

If there is any transmission node address to which no output channels have been allocated, the process advances to Step 1706. Otherwise, the process advances to Step 1707.

In the example shown in FIG. 19, as for the group of which the transmission node address is "010", as an output channel has already been allocated to Virtual Channel 2 that share the same transmission node address at Input Port 0, the number of output channels set becomes one. As for the groups of which the transmission node addresses are "110" and "111", respectively, on the other hand, no output channels have been allocated yet to any of the virtual channels that share the same transmission node address, and therefore, the number of output channels set becomes zero. That is to say, as there are two transmission node addresses (110, 111) to which no output channels have been set yet in the example shown in FIG. 19, the process advances to Step 1706.

In Step 1706, the output channel selecting section 809 selects a virtual channel with the earliest deadline from the virtual channels at each of the transmission nodes to which no output channels have been set yet. In other words, the output channel selecting section 809 selects a virtual channel that has been given the top priority.

In the example shown in FIG. 19, among the groups (110, 111) to which no output channels have been set yet, Virtual Channel 0 at Input Port 1 which has the earliest deadline is selected.

If every transmission node address group has at least one virtual channel to which an output channel has already been set, then the output channel selecting section 809 allocates in Step 1707 an output channel to a virtual channel with the earliest deadline in every group of virtual channels.

By performing these processing steps 1701 through 1707 over and over again, the router 801 can give a virtual channel with the earliest deadline the top priority while allocating one or more output channels to every transmission node group.

Figure 20A:
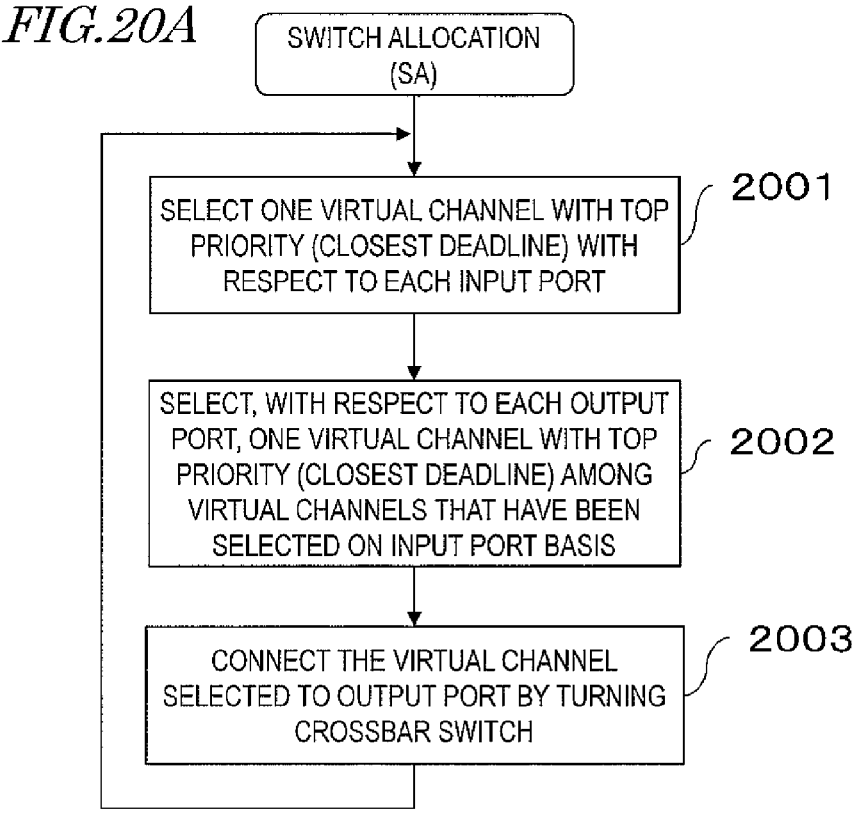
FIGS. 20A and 20B show how the virtual channel selecting section 810 and the switch turning section 811 connect a virtual channel 813, for which an output port and an output channel have already been selected, to that output port and specify the timing to transmit flits (i.e., switch allocation processing) in Step 1008 shown in FIG. 10.
Figure 20B:
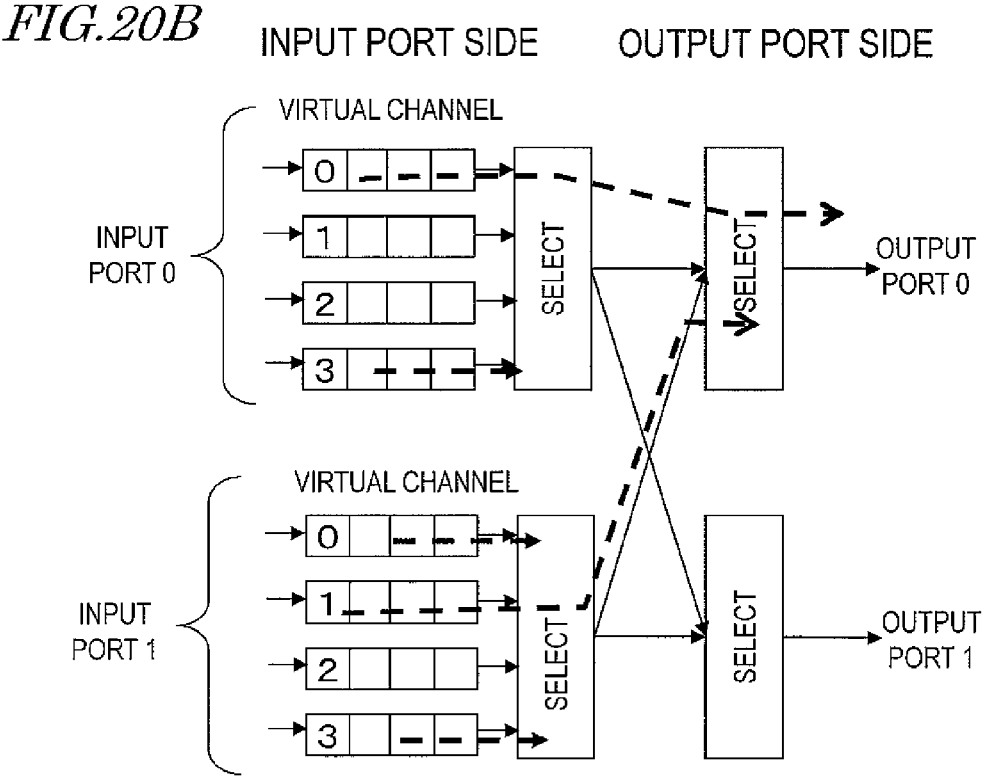

FIGS. 20A and 20B show how the virtual channel selecting section 810 and the switch turning section 811 connect a virtual channel 813, for which an output port and an output channel have already been selected, to that output port and specify the timing to transmit flits (i.e., switch allocation processing) in Step 1008 shown in FIG. 10.

FIG. 20A is a flowchart showing an exemplary procedure of that operation, and FIG. 20B shows the flow of such an operation of determining which output port should be connected to a virtual channel for which an output channel has already been selected.

First, in Step 2001, the virtual channel selecting section 810 selects one virtual channel, to which an output channel has already been set, with respect to each input port.

In the example shown in FIG. 20B, for instance, four virtual channels are provided for each of Input Ports 0 and 1, output channels have already been set with respect to Virtual Channels 0 and 3 at Input Port 0, and output channels have already been set with respect to Virtual Channels 0, 1 and 3 at Input Port 1.

The virtual channel selecting section 810 selects one of those virtual channels, to which output channels have already been set, at each of those input ports. In FIG. 20B, the virtual channel selecting section 810 selects Virtual Channels 0 and 1 with respect to Input Ports 0 and 1, respectively.

Next, in Step 2002, the switch turning section 811 selects one of the virtual channels that have been selected on the input port side and that contend with each other for the same output port with respect to each output port.

In FIG. 20B, if both of the virtual channels that have been selected on Input Ports 0 and 1 request to be connected to the same Output Port 0, then the switch turning section 811 selects one of these two virtual channels.

The switch allocation processing does not have to be carried out as described above but may also be done by any other method.

For example, in the processing step 2001 of selecting one of the virtual channels with respect to each input port and in the processing step 2002 of selecting one of the virtual channels with respect to each output port as shown in FIG. 20A, multiple virtual channels may be sequentially selected one after another every cycle by Round Robin method or may even be selected at random on a probability basis. If the virtual channels from which flits are transmitted are changed every cycle in this manner, then multiple packets coming from different sources can be interleaved together on a flit by flit basis and can be output apparently in parallel with each other.

As can be seen, by locating the transmission nodes of respective packets and by allocating a limited number of virtual channels on a NoC router to those packets coming from multiple different transmission nodes, the router 801 of this embodiment can avoid a situation where packets coming from the same transmission node occupy all virtual channels of the router 801 and prevent the router 801 from arranging the transmission timing schedule between packets coming from multiple different transmission nodes. In this manner, the router 801 can minimize a decline in transmission performance in terms of throughput, time delay and jitter.

In the embodiment described above, the time information comparing section 808 allocates output channels based on the deadlines that have been set with respect to packets. However, the allocation of output channels may also be prioritized by reference to packet-relay-related time information, instead of the deadlines.

FIG. 21 shows an example of time information and exemplary criteria on which packets may be prioritized by reference to the time information.

As the time information, the amount of time that has passed since a packet was transmitted may be used, for example.

To manage the transmission time as a piece of time information, however, the number of digits of the time information should be large enough to indicate the operating period of a given semiconductor system. That is why if the semiconductor system operates for a long time, then the number of digits of the time information becomes a huge one.

On the other hand, if the amount of time that has passed since a packet was transmitted is used as a piece of time information, the number of digits of the time information has only to be large enough to indicate the time it takes to receive a packet that was transmitted. As a result, the number of digits of the time information can be relatively small. And the smaller the number of digits of a value to be handled as a piece of time information, the smaller the size of the time information comparator at the time information comparing section 808 can be. As a result, the resources of the semiconductor system can be cut down effectively.

Also, even if the transmission time is used, the number of digits of a value to be handled as time information can also be reduced by using only a part of the transmission time to be represented as month/day/year/hour/minute/second. For example, if the transmission time is represented by M digits, the value may be n least significant digits (where n is an integer that satisfies M>n). The n digits may be large enough to indicate the amount of time it takes to receive a packet transmitted, for example.

Alternatively, by using the deadline by which a packet is supposed to arrive at a reception node as the time information, output channels may be sequentially allocated to packets in the order of deadlines.

Generally speaking, the time delay that can be permitted until a packet transmitted arrives at a reception node varies according to the type of the bus master or the contents of the processing. That is why supposing a situation where after a number of packets, of which the deadlines are relatively long way off, have been transmitted from a transmission node, a packet, of which the deadline is relatively short way off, is transmitted from the transmission node, a larger number of packets can arrive within the permissible time delay by transmitting packets with output channels sequentially allocated to packets in the order of their deadlines (i.e., so that an output channel is allocated to a packet, of which the deadline is shortest way off, earlier than any other packet) rather than in the order of their transmission times (i.e., so that an output channel is allocated to a packet with the earliest transmission time first).

Still alternatively, the time information may also be the time left before a deadline, instead of the deadline itself.

In the embodiment described above, the transmission node classifying section 807 is supposed to classify the transmission nodes according to their addresses. However, this is only an example and the transmission nodes do not have to be classified on an address basis.

Figures 22A, 22B:
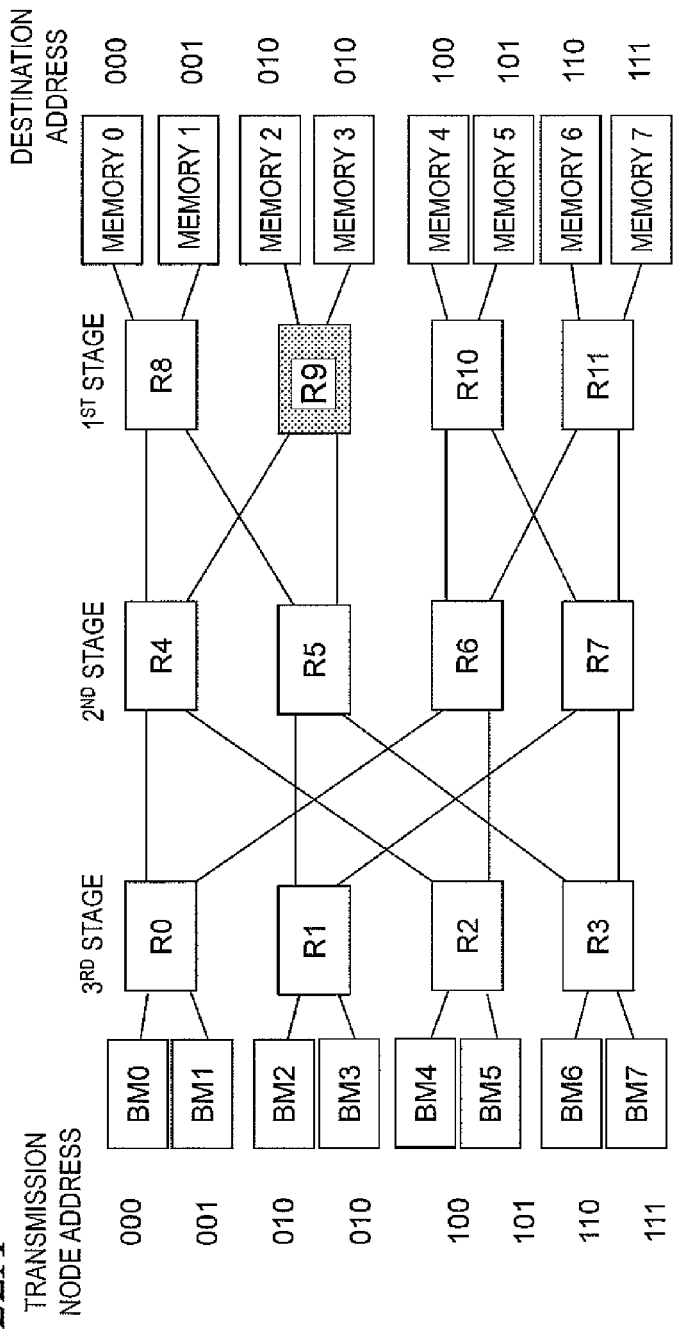
FIGS. 22A and 22B show how various sources may be defined with respect to a router R9 and specifically what those sources defined may be.

For example, a router may also be specified as the transmission node. FIGS. 22A and 22B show how various sources may be defined with respect to a router R9 and specifically what those sources defined may be. For example, in the configuration shown in FIG. 22A, any of the routers on a transmission route through which a packet passes may be defined as its transmission node.

Specifically, if a transmission node for the router R9 shown in FIG. 22A is supposed to be a bus master, the transmission node for the router R9 may be any of the eight Bus Masters BM0 through BM7. On the other hand, if a transmission node for a router is supposed to be another router which is at most two stages before the former router, the transmission node for the router R9 may be any of the four Routers R0 through R3. Furthermore, if the source is defined to be another router on the previous stage, then the transmission node for the router R9 may be one of the two routers R4 and R5.

Furthermore, in the example illustrated in FIG. 22A, the previous router through which a packet has passed just before reaching a router on an $n^{th}$ stage can be identified by the numerical value on the $(n+1)^{th}$ digit (as counted from the right) of the source address specified for the packet.

For example, the router R9 shown in FIG. 22A is a router on the first stage. Thus, if it can seen by reference to the source address of a packet received that the numerical value on the second digit from the right is zero, then the decision is made that the packet has passed through the router R4. On the other hand, if the source address of a packet received tells that the numerical value on the second digit from the right is one, then the decision is made that the packet has just passed through the router R5. The router that each packet has just passed through on the previous stage can be identified in this manner.

Meanwhile, the router through which a packet passed two stages before reaching a router on an $n^{th}$ stage can be identified by the numerical values on the $(n+1)^{th}$ and $(n+2)^{th}$ digits (as counted from the right) of the source address specified for the packet.

For example, first of all, the source address of a packet that has been received at the router R9 on the first stage shown in FIG. 22A is checked out. If the source address tells that the numerical values on the second and third digits from the right are "00", then the decision is made that the packet passed through the router R0. On the other hand, if the source address tells that the numerical values on the second and third digits from the right are "01", then the decision is made that the packet passed through the router R1. Furthermore, if the source address tells that the numerical values on the second and third digits from the right are "10", then the decision is made that the packet passed through the router R2. And if the source address tells that the numerical values on the second and third digits from the right are "11", then the decision is made that the packet passed through the router R3. The router that each packet passed through two stages before can be identified in this manner.

By defining a router on the transmission route to be the transmission node in this manner, the number of the groups into which the transmission node classifying section 807 should classify the transmission nodes can be smaller, and the transmission node comparison processing between virtual channels can be done more easily, than in a situation where a bus master that actually transmitted a packet is defined to be the transmission node.

Optionally, in order to reduce the number of the groups into which the transmission node classifying section 807 should classify the transmission nodes, a plurality of transmission nodes may be classified into a single group and handled as a single source.

Figure 23A:
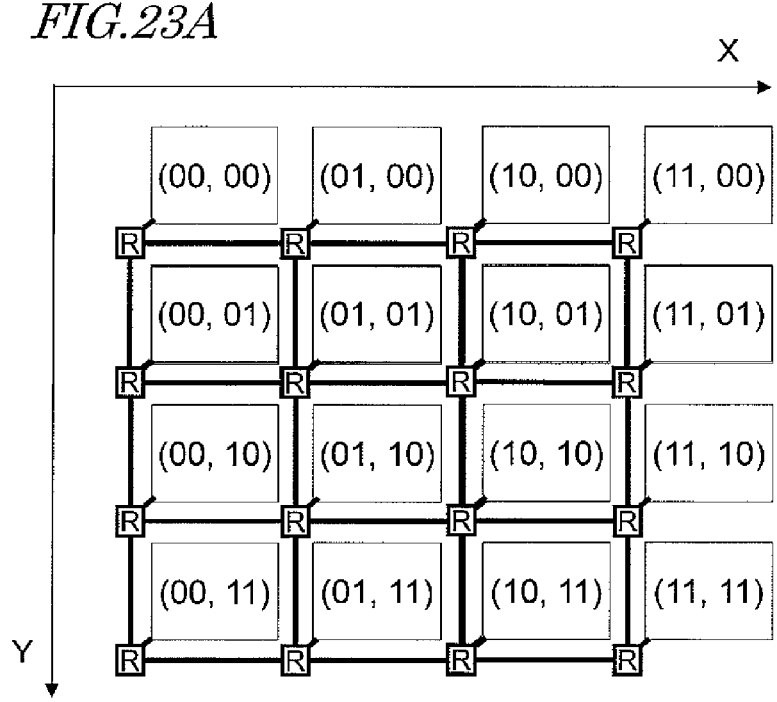
FIGS. 23A and 23B illustrate an example of a mesh-type NoC grouped in a situation where a plurality of transmission and reception nodes are regarded as forming a single group.
Figure 23B:
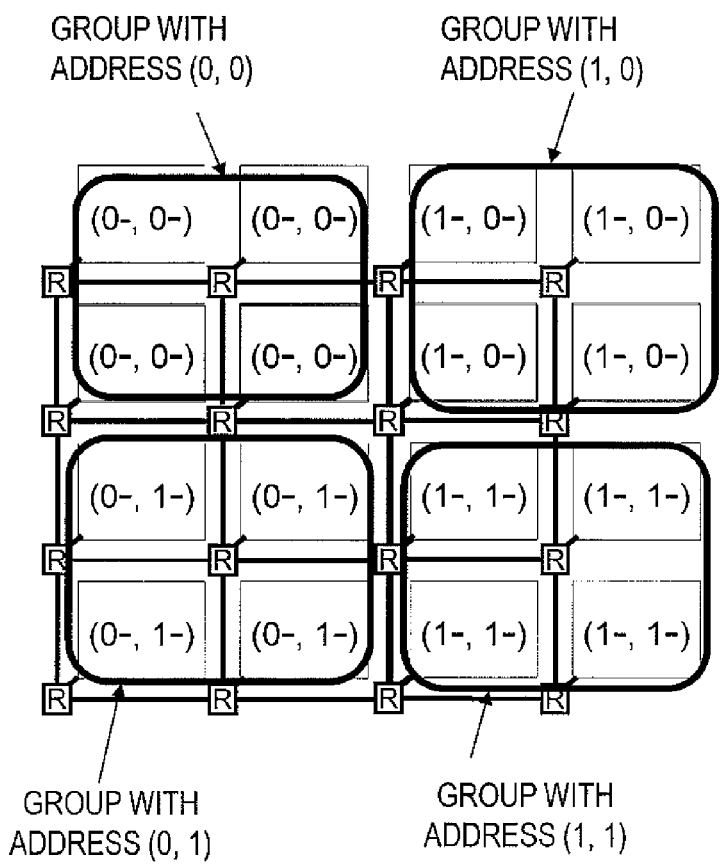

For example, FIG. 23A shows the addresses of bus masters on a mesh NoC, and FIG. 23B shows how the bus masters may be grouped according to the first digit values of the address (X, Y).

Hereinafter, it will be described how a plurality of transmission and reception nodes may be handled as a single group, taking the mesh NoC shown in FIG. 23A as an example.

FIG. 23A illustrates a mesh NoC comprised of a plurality of bus masters, to which addresses such as (00, 00) have been given, and a plurality of routers (R).

In the NoC shown in FIG. 23A, sixteen bus masters are arranged in four columns and four rows to form a grid pattern and are connected together with the routers. In FIG. 23A, the address of each bus master is defined by X and Y coordinates that are represented as two two-digit binary numbers on the supposition that the X- and Y-axes are respectively defined horizontally and vertically in FIG. 23.

In this case, if the bus masters are classified by the first-digit values (as counted from the left) of the X and Y coordinates of each bus master's address, then the sixteen bus masters can be classified into the four groups, of which the first-digit addresses are (0, 0), (0, 1), (1, 0) and (1, 1), respectively, as shown in FIG. 23B.

And when attention is paid to a router belonging to a certain group, one of the four virtual channels, consisting of a virtual channel that stores a packet that has been transmitted from within its own group and three more virtual channels that store packets that have been transmitted from the three other groups, may be given the top priority if that virtual channel stores a packet with the earliest deadline.

Optionally, a plurality of transmission and reception nodes may also be classified into a single group according to the second-digits values (as counted from the left) of the X and Y coordinates of each transmission or reception node address.

Moreover, the transmission and reception nodes may also be grouped differently according to the specific shape of the NoC topology or depending on how to determine the address of each bus master.

If a packet has arrived at a router that is regarded as a transmission node, then that router may define its own transmission node again according to any of the definitions shown in FIG. 21B and may forward that packet.

Optionally, in order to reduce the number of the groups into which the transmission node classifying section 807 should classify the transmission nodes, a plurality of transmission nodes may be classified into a single group according to the topology or bus type in the integrated circuit and handled as a single source. That is to say, even if there are a number of transmission nodes when viewed microscopically, those transmission nodes may also be regarded as forming a single transmission node when viewed macroscopically.

Figure 24:
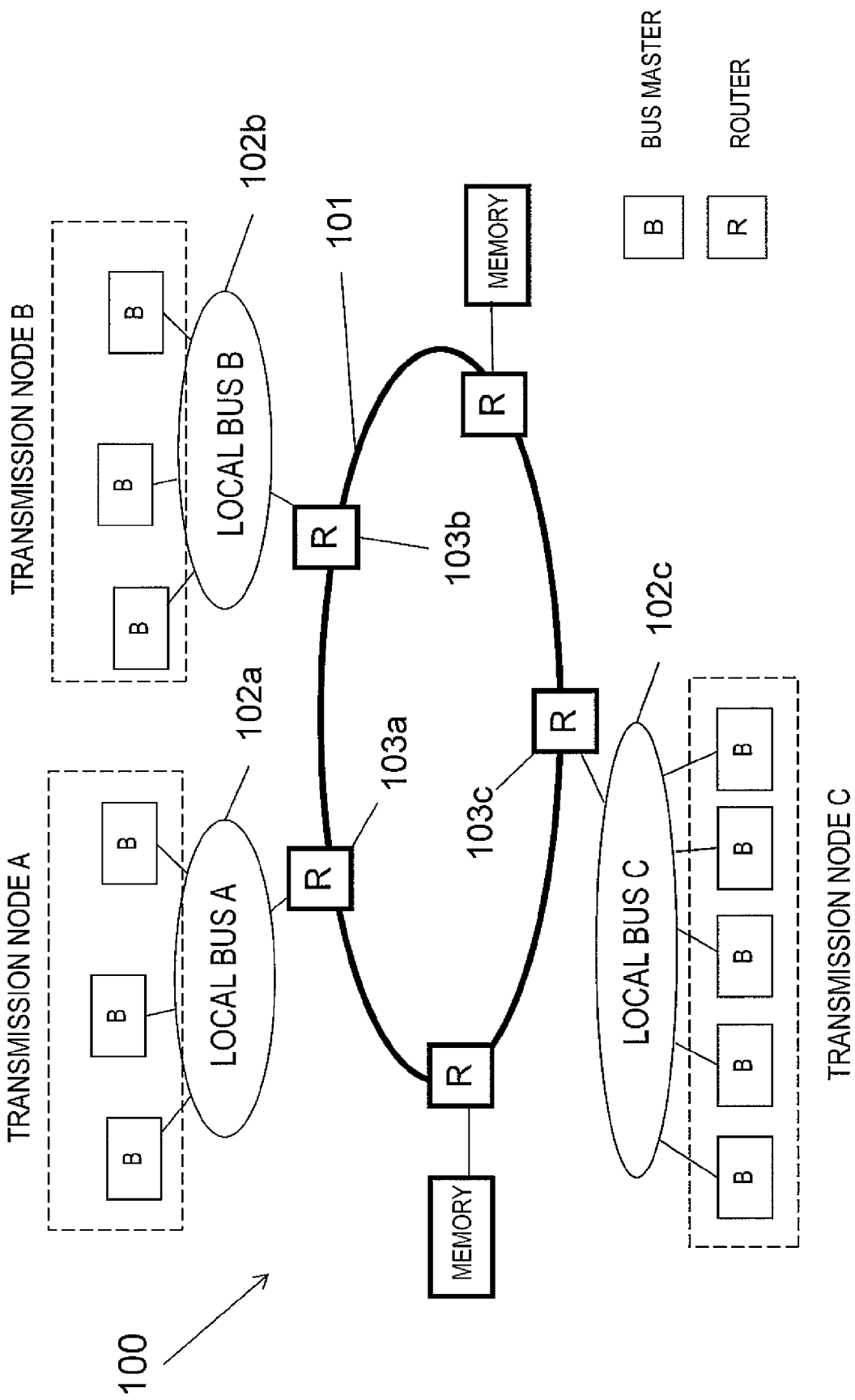
FIG. 24 illustrates an example in which a set of bus masters belonging to the same local bus is regarded as forming a single group.

FIG. 24 illustrates a configuration for an integrated circuit 100 in which a set of bus masters (which will be sometimes referred to herein as a "bus master group") is regarded as a single transmission node.

The integrated circuit 100 shown in FIG. 24 includes two different types of buses. One type is a key route bus 101 which connects together a plurality of routers in a broad range so that communications can be made between them at high speeds, while the other type is local buses 102*a* through 102*c*, each of which connects together a plurality of routers over a relatively short distance so that communications can be made between them at low speeds. The key route bus 101 and the local buses 102*a* through 102*c* are connected together with routers 103*a* through 103*c*, each of which has the ability to transmit data between buses with different transmission bands. Optionally, a router with such ability may be provided as a dedicated one.

In the example illustrated in FIG. 24, three sets of bus masters (or bus master groups) belonging to Local Buses A, B and C, respectively, are regarded as Transmission Nodes A, B and C, respectively. It should be noted that each router in a local bus operates using respective bus masters as respective transmission nodes.

Generally speaking, due to various constraints on bus interconnection, operating frequency and other parameters, it is not easy to connect together every bus master on an integrated circuit with only a high-speed bus. That is why by aggregating together the data transmitted from a plurality of bus masters using local buses and transmitting packets to the nearest key route bus as shown in FIG. 24, such constraints on bus interconnection, operating frequency and other parameters can be relaxed.

As can be seen, in a situation where multiple sets of bus masters are separately connected together with multiple different local buses, each set of bus masters belonging to the same local bus may be handled as a single transmission node in order to reduce the number of groups into which the transmission nodes should be classified by the transmission node classifying section 807.

To determine which of the multiple local buses a given bus master belongs to, multiple different methods may be used and include the following, for example:

(1) Each router may retain, in the transmission node classifying section 807, a table of correspondence between a transmission node address by which the source bus master can be identified and a local bus to which the bus master belongs and compares the transmission node address of the received packet to the contents of the table. In this manner, each router can determine from which local bus the packet has been transmitted; and (2) Local bus identifier information may be stored in the header field 301 of each packet and a router that has received the packet refers to the header field 301. In this manner, each router can determine from which local bus the packet has been transmitted.

In FIG. 24, a plurality of bus masters connected to the same local bus is regarded as a single transmission node. However, the transmission node does not have to be defined on a local bus basis but may also be defined according to the topology or the bus type.

More specifically, a plurality of local buses may be combined together and regarded as a single transmission node as well. For example, if the number of bus masters belonging to Local Bus A or B is smaller than that of bus masters belonging to Local Bus C and if a smaller number of packets are transmitted from Local Bus A or B than from Local Bus C, then the bus masters belonging to Local Buses A and B may be combined together and regarded as a single transmission node. By reducing the number of bus masters belonging to each transmission node, the number of packets to transmit per unit time can also be reduced.

Embodiment 2

In the first embodiment described above, in a router on a semiconductor integrated circuit on which various constraints are imposed during a circuit design process in terms of the number of virtual channels or the size, the transmission nodes of packets to be transmitted from the router are located and one or more virtual channels of another router, which is an adjacent reception node, are supposed to be allocated to the packets coming from each transmission node. As a result, while maintaining a state in which the transmission schedule of multiple packets coming from multiple transmission nodes can be arranged, their transmission efficiency can be improved in terms of throughput and propagation delay.

According to this second embodiment, if the packet transfer rates vary from one transmission node to another, the router adjusts the number of virtual channels to be allocated by another router, which is an adjacent reception node, according to the degree of traffic flow congestion of packets coming from each transmission node so that virtual channels of the adjacent router are allocated preferentially to a particularly congested traffic flow of packets, thereby improving the transmission efficiency of a NoC.

The traffic flow of packets may get congested to varying degrees even in the same router according to the transmission node in the situation shown in FIG. 5, for example. Specifically, in FIG. 5, packets are transmitted at shorter intervals from Master A than from Master B, and therefore, the traffic flow of packets coming from Master A is more congested than that of packets coming from Master B. As a result, in Router A, the number of virtual channels that store the packets coming from Master A is four, whereas that of virtual channels that store the packets coming from Master B is two.

In such a situation, if Router A allocated the virtual channels of Router B to the packets that have been transmitted from its own virtual channels so that the packets will be stored evenly in those virtual channels at Router B as shown in FIG. 6, then the virtual channels on the way to Router A would be occupied more easily with the more congested traffic flow of packets coming from Master A. In that case, even if packets should be transmitted from another transmission node (such as Master C), the packets could not be transmitted immediately because there would be no virtual channels available on the way.

Figure 25:
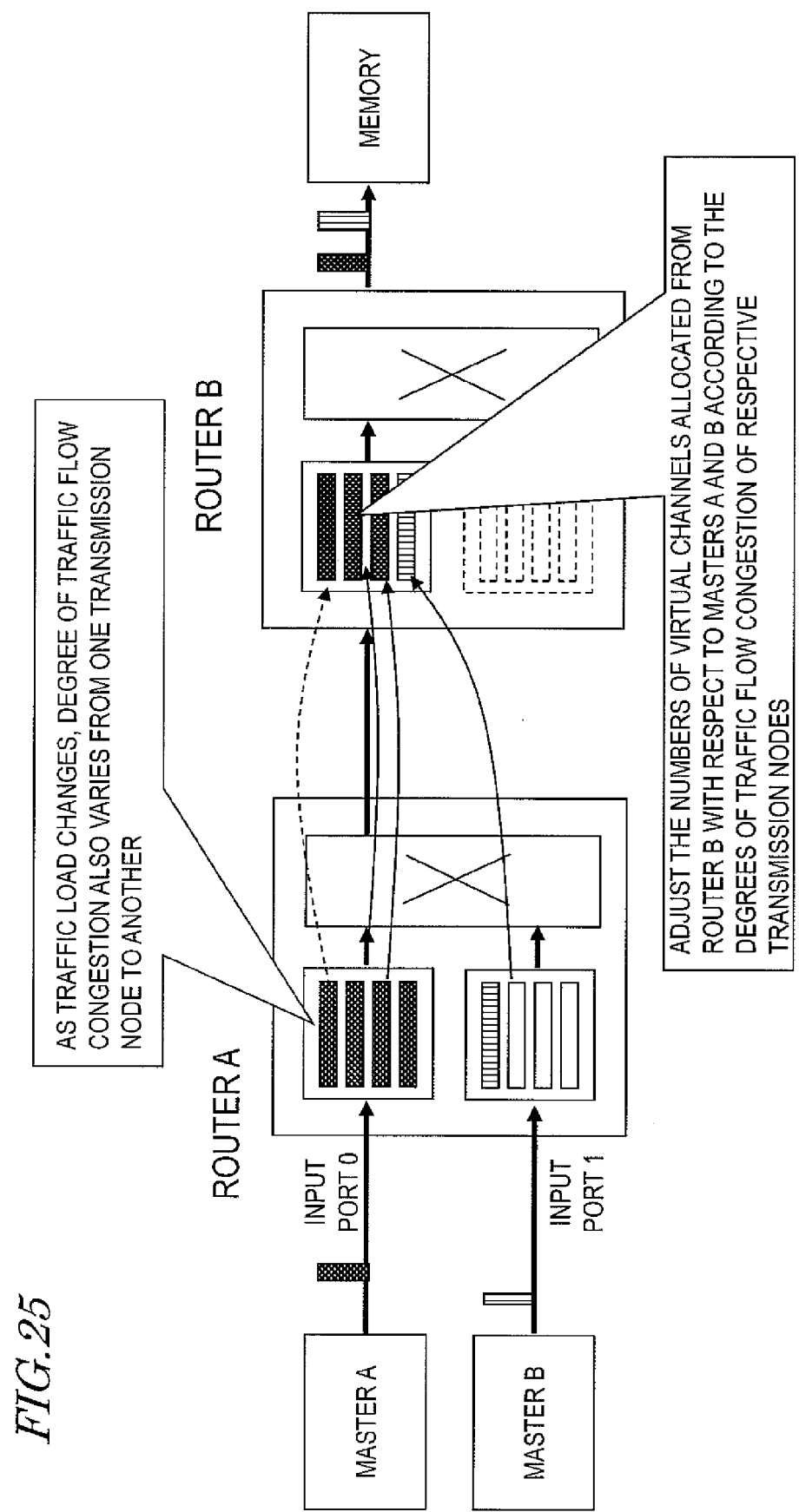
FIG. 25 illustrates how a router according to a second exemplary embodiment operates.

FIG. 25 illustrates how the router of this embodiment operates.

The configuration shown in FIG. 25 itself is the same as what is shown in FIGS. 5 and 6, and its description will be omitted herein.

According to this second embodiment, Router A not only allocates at least one virtual channel at Router B to packets coming from each transmission node in order to maintain the intended transmission schedule but also allocates virtual channels at Router B preferentially to a more congested traffic flow of packets based on the relation in the number of virtual channels used between Routers A and B.

Router A shown in FIG. 25 allocates one virtual channel at Router B to a packet coming from Master A and another virtual channel at Router B to a packet coming from Master B first. And then Router A adjusts the numbers of virtual channels to be allocated from Router B to the packets coming from the respective masters so that the difference in the number of virtual channels used between Routers A and B becomes as uniform as possible.

In the example illustrated in FIG. 25, first of all, one virtual channel at Router B is allocated to each of the packets coming from Masters A and B. And as the ratio of the number of virtual channels used at Router A for packets coming from Master A to that of virtual channels used there for packets coming from Master B is four to one, the virtual channels at Router B are allocated preferentially to packets coming from Master A so that the ratio of the numbers of packets used at Router B also becomes as close to four to one as possible.

Figure 26:
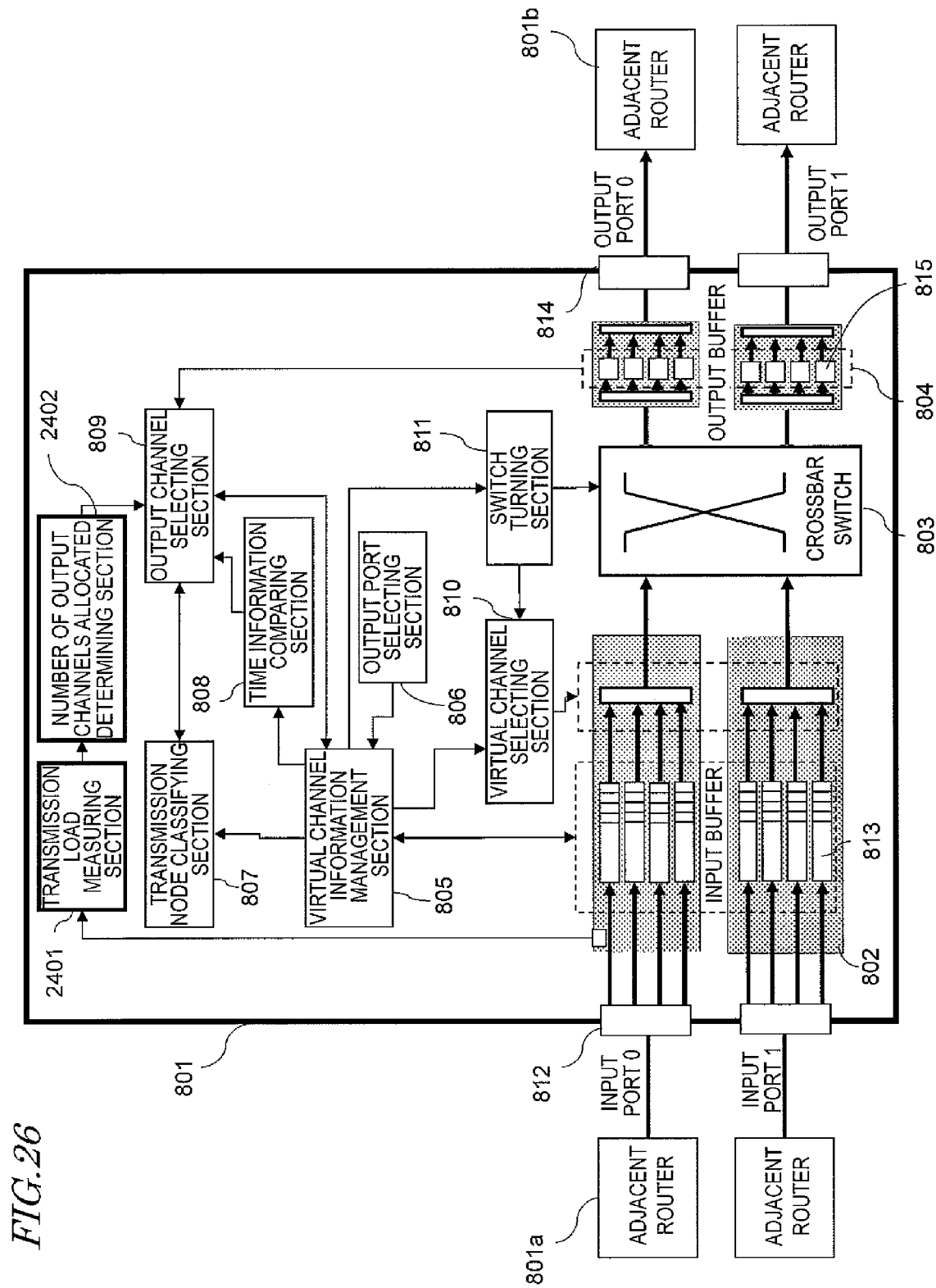
FIG. 26 illustrates a configuration for a router according to the second exemplary embodiment.

FIG. 26 illustrates a configuration for a router according to this embodiment.

In FIG. 26, any component having substantially the same function as its counterpart of the first embodiment is identified by the same reference numeral and its description will be omitted herein.

A transmission load measuring section 2401 calculates, on a transmission node basis, a value (or an index) indicating how heavy or how congested the traffic flow of packets as a load will be. And based on the packet transmission load that has been measured on a transmission node basis, a number of output channels allocated determining section 2402 determines how many virtual channels should be allocated from the router 801b that is the reception node.

Figure 27:
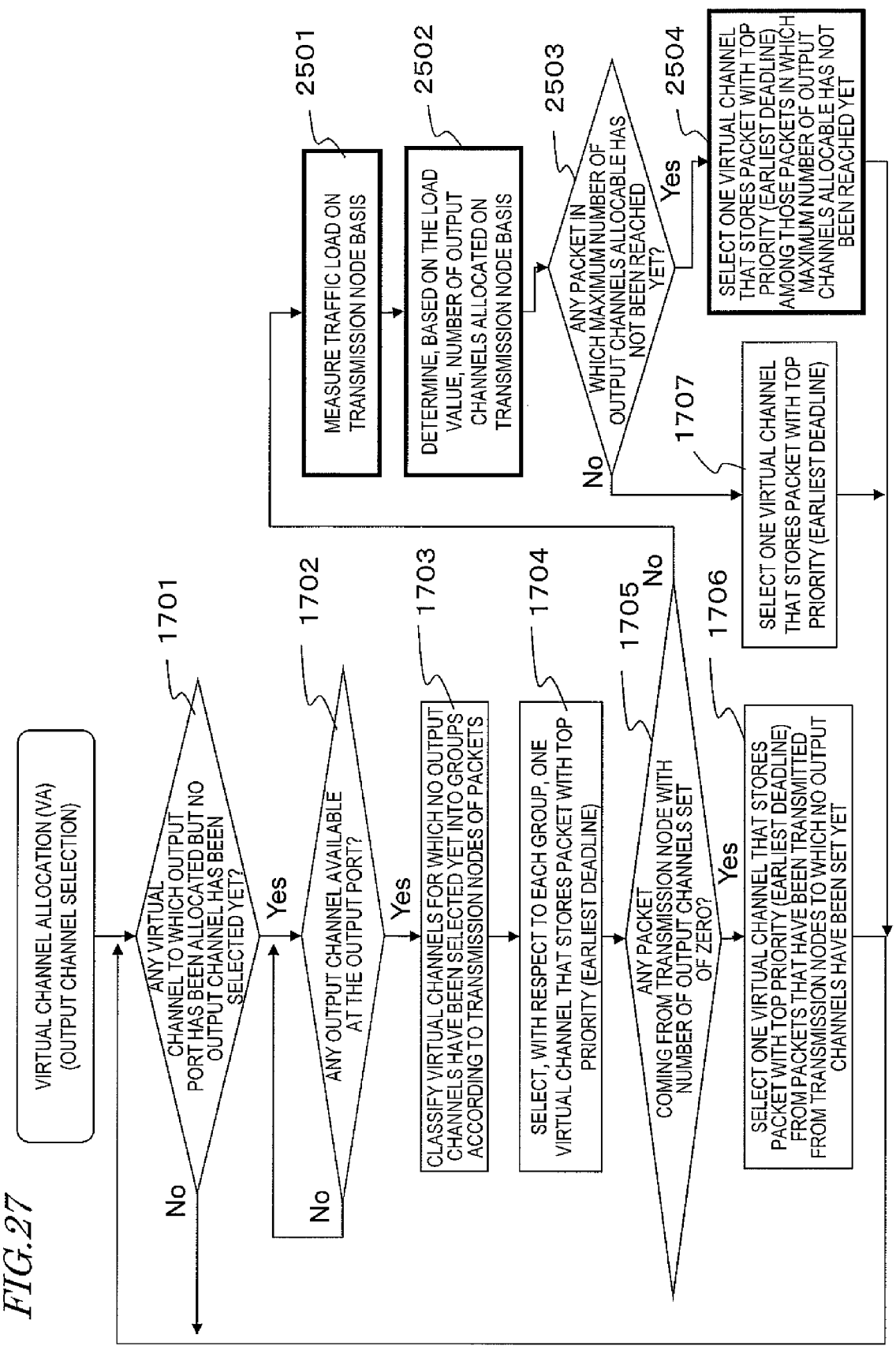
FIG. 27 is a flowchart showing how the router of the second exemplary embodiment operates.

FIG. 27 is a flowchart showing how the router of this embodiment operates. In FIG. 27, the same processing step as the one shown in FIG. 10 is identified by the same reference numeral and its description will be omitted herein.

If it has turned out, in Step 1705, that at least one output channel 815 is allocated to packets that have come from every transmission node and that are now stored in the router 801, the transmission load measuring section 2401 of the router 801 measures the degree of traffic flow congestion of packets on a transmission node basis in Step 2501.

Figure 28:
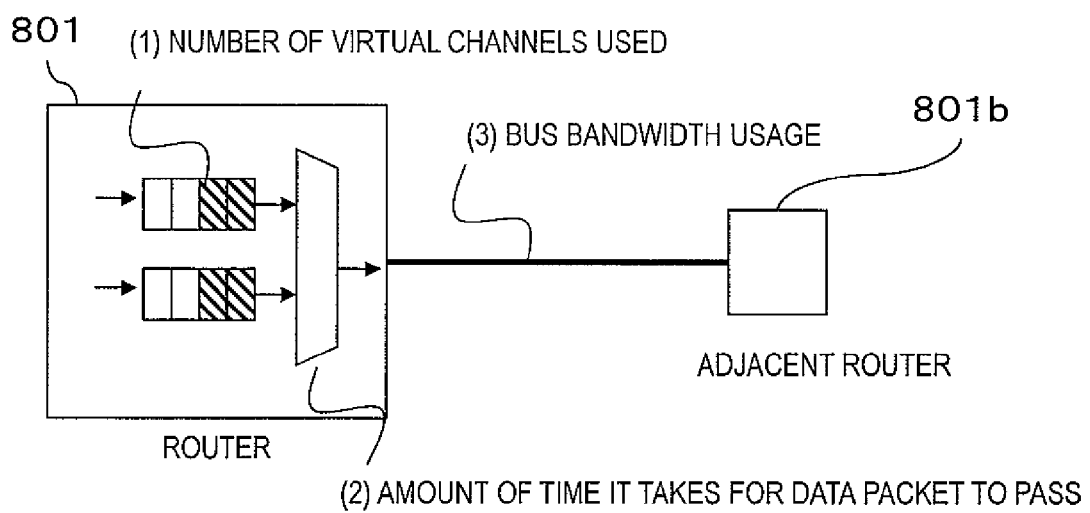
FIG. 28 shows exemplary indices indicating the degree of traffic flow congestion of packets at the router 801 on a NoC.

FIG. 28 shows exemplary indices indicating the degree of traffic flow congestion of packets at the router 801 on a NoC.

Examples of such indices indicating the degree of traffic flow congestion of packets on a transmission node basis include (1) the number of virtual channels used, (2) the amount of passage time it takes for a packet arrived at the router to pass through it, and (3) the bus bandwidth usage (which may be either the band actually used by the bus or a designed bandwidth).

In the following description, the index indicating the degree of traffic flow congestion of packets on a transmission node basis is supposed to be (1) the number of virtual channels used.

In Step 2502, the number of output channels allocated determining section 2402 compares, on a transmission node basis, the number of virtual channels at the router 801 for which no output channels have been set yet to the number of output channels that have already been allocated (corresponding to the number of virtual channels at the router 801b), and prioritizes the output channel allocation based on that difference.

FIG. 29 shows how the number of output channels allocated determining section 2402 may operate.

In FIG. 29, Router A has four virtual channels for which no output channels have been selected yet, and the packets that are stored in those virtual channels have come from three different transmission nodes of which the addresses are "010", "110" and "111", respectively. Specifically, the four packets are supposed to consist of one packet that has come from a transmission node with the address "010", one packet that has come from a transmission node with the address "110", and two packets that have come from a transmission node with the address "111". And one output channel is supposed to have already been allocated to each transmission node.

The number of output channels allocated determining section 2402 calculates, on a transmission node basis, the difference between the number of virtual channels for which output channels have not been set yet and the number of output channels used, and defines the difference to be the number of output channels still available for packets coming from that transmission node.

In the example shown in FIG. 29, the number of output channels still available for packets coming from the transmission node with the address "010" is zero, the number of output channels still available for packets coming from the transmission node with the address "110" is zero, and the number of output channels still available for packets coming from the transmission node with the address "111" is one.

If the output channel selecting section 809 has determined, in Step 2503, that there are any packets, for which the number of output channels still available is at least one, the process advances to Step 2504. On the other hand, if the number of output channels still available is zero (i.e., if every output channel has already been allocated), the process advances to Step 1706.

If there are any packets, for which the number of output channels still available is at least one, the output channel selecting section 809 allocates, in Step 2504, an output channel to one of those packets with the top priority.

In the example shown in FIG. 29, since the number of output channels still available for packets coming from the transmission node with the address "111" is one, an output channel is allocated to the packet with the earliest deadline to be stored in Virtual Channel 0 at Input Port 1.

By making the router of this second embodiment with the configuration shown in FIG. 26 perform the processing steps shown in FIG. 27, even if the packet transfer rates vary from one transmission node to another, virtual channels at an adjacent router are allocated preferentially to a congested traffic flow of packets on a transmission node basis, thereby minimizing the traffic flow congestion and increasing the transmission efficiency of the NoC.

Exemplary embodiments of the present disclosure are as described above.

In the first and second embodiments described above, the topology of the integrated circuit is supposed to be the multistage interconnection network. However, a router as an exemplary embodiment of the present disclosure does not have to be used in such a multistage interconnection network. Alternatively, a mesh-type topology may also be formed by arranging multiple routers as a grid as shown in portion (A) of FIG. 30. Still alternatively, a torus-type topology, in which routers are connected both vertically and horizontally to form a ring shape, may also be adopted as shown in portion (B) of FIG. 30. Furthermore, a hierarchical topology, in which buses are connected together hierarchically, may even be adopted as shown in portion (C) of FIG. 30. Anyway, the router of the present disclosure is applicable in the same way to any topology in which a number of bus masters are connected together through distributed buses.

FIG. 31 illustrates an example in which a router according to an embodiment of the present disclosure is applied to a memory bus.

In the exemplary application illustrated in FIG. 31, bus masters (including CPUs, DSPs, transmission processing sections and image processing sections) on a semiconductor integrated circuit for use in portable electronic devices such as cellphones, PDAs (personal digital assistants) and electronic book readers, TVs, video recorders, camcorders and surveillance cameras are connected to multiple memories with distributed buses.

When multiple applications or services are used in parallel with each other (e.g., when multiple different video clips or musical tunes are reproduced, recorded or transcoded, or when book, photograph or map data is viewed or edited, or when a game is played), respective bus masters will access memories more frequently. If there was only one memory to be accessed by the respective bus masters, then those accesses would be overconcentrated at one point. To reduce such an overconcentration of accesses, however, the input and output transmission ranges should be broadened on the memory side, which would increase the cost.

One way for avoiding such overconcentrated memory accesses, the memories to be used by bus masters may be physically classified according to the type of the application or the service, and those bus masters and memories may be connected together with distributed buses.

However, in the example illustrated in FIG. 31, if a bus master has transmitted a data packet to Memory A at a high rate in order to save video data there and if the respective routers just relay data packets received with the order of reception maintained, then every virtual channel on the transmission route will be occupied with the packet to be sent to Memory A frequently. In that case, data will not flow to the other memories smoothly and the performances of the other applications or services will decline and the processing time will increase.

If the router of the present disclosure is used, however, virtual channels of each router can be allocated uniformly to packets to be sent to multiple different destinations. As a result, the router of the present disclosure can prevent packets to be sent to a particular memory from occupying the virtual channels, thus contributing to improving the performances of all applications and services on a semiconductor integrated circuit and shortening the processing time.

It should be noted that the memories described above may be either volatile DRAMs or nonvolatile flash memories. Or the memories may even be a combination of volatile and nonvolatile memories.

FIG. 32 illustrates an example in which routers according to an exemplary embodiment of the present disclosure are used on a multi-core processor.

In the multi-core processor shown in FIG. 32, a number of core processors such as a CPU, a GPU and a DSP are arranged in a mesh pattern and connected together with distributed buses in order to improve the processing performance of those core processors.

On this multi-core processor, communications are carried out between the respective core processors. For example, each core processor has a cache memory to store required data to get computational processing done. And information stored in the respective cache memories can be exchanged and shared with each other between those core processors. As a result, their performance can be improved.

However, the communications are carried out between those core processors on such a multi-core processor at respectively different locations, over mutually different distances (which are represented by the number of routers to hop), and with varying frequencies of communication. That is why if data packets transmitted are just relayed with their order of reception maintained, then some routers will have all of their virtual channels occupied with packets to be sent to particular core processors and will not let the data flow smoothly. As a result, the performance of the multi-core processor will decline and its processing time will increase.

If the router of the present disclosure is used, however, virtual channels of each router can be allocated uniformly to packets to be sent to multiple different destinations. As a result, the router of the present disclosure can prevent packets to be sent to a particular core processor from occupying the virtual channels, thus contributing to improving the performances of those core processors and shortening the processing time.

The router described above may be implemented as either a set of hardware circuits or a software program. For example, the respective components shown in FIG. 8 may be implemented as hardware circuits. Or the actual circuit may also be designed by carrying out simulations with the operations of those components of the router defined as respective processing steps of a design tool and with various operating conditions entered as parameters. By implementing one or more components of the router as the design tool, the bus bandwidth can be designed through a computational program, there is no need to perform cut-and-try design and verification on the bus bandwidth through simulations or emulations, and the number of development process steps can be cut down, which is very advantageous.

A router according to an embodiment of the present disclosure can arrange the virtual channel allocation schedule efficiently for the respective packets transmitted through the routers in an integrated circuit with distributed buses, thus contributing to improving the overall transfer performance of a NoC in terms of throughput, propagation delay and jitter. With this router, there is no need to increase the number of virtual channels that will impose a lot of restrictions on the circuit design process. That is why when a DSP for processing multiple media and a CPU for transferring files at high rates are integrated together on a single SoC (system on chip) with distributed buses, the present disclosure contributes effectively to getting the circuit design process done with a lot of resources saved and with the processing time delay cut down.

On top of that, since a lot of resources can be saved and the processing time delay can be reduced, the present disclosure also contributes to cutting down the power dissipation of the entire integrated circuit.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A router which relays a packet to be transmitted from one node to another in an integrated circuit that has distributed buses according to a packet exchange method, the router comprising:
    a plurality of buffers, each of which configured to store packets with information indicating their transmission node;
    a classifying section configured to classify the buffers that store the packets into a number of groups according to the transmission nodes of the packets;
    a selecting section configured to select at least one of the buffers of each said group; and
    an output port configured to sequentially output the packets that are stored in the selected buffer
    wherein time information is added to the packet, and
    wherein if two or more buffers belong to any of the groups of buffers classified, the selecting section selects, by reference to the time information of the packets that are stored in the respective buffers, one of the two or more buffers as a buffer with the top priority, and
    wherein if only one buffer belongs to any of the groups of buffers classified, then the selecting section selects the only one buffer as a buffer with the top priority.

2. The router of claim 1, wherein the output port outputs the respective packets that are stored in the buffer with the top priority in each said group in an order which is determined by reference to the time information of the respective packets.

3. The router of claim 2, wherein the time information is a deadline by which a packet is supposed to arrive at its destination node, and
    wherein the output port outputs the respective packets that are stored in the buffer with the top priority in each said group in such an order that a packet with the earliest deadline is output earlier than any other packet.

4. The router of claim 3, wherein the time information is a transmission time when a packet was transmitted from a source node, and
    wherein the output port outputs the respective packets that are stored in the buffer with the top priority in each said group in such an order that a packet with the earliest transmission time is output earlier than any other packet.

5. The router of claim 1, wherein the transmission node is either a single bus master or a set of multiple bus masters, and
    wherein the classifying section classifies the buffers into multiple groups according to the single bus master, the set of bus masters, or one or multiple routers that the packet has passed through on a transmission route.

6. The router of claim 5, wherein the classifying section classifies the buffers that store the packets into multiple groups according to the router(s) that the packets have passed through on the transmission route.

7. The router of claim 5, wherein there are multiple transmission nodes, which have been classified in advance so that each said transmission node belongs to any of multiple groups, and
    wherein the classifying section classifies, according to the group to which a transmission node that has transmitted the packets belongs, the multiple buffers that store the packets into a number of groups.

8. A router which relays a packet to be transmitted from one node to another in an integrated circuit that has distributed buses according to a packet exchange method, the router comprising:
    a plurality of buffers, each of which configured to store packets with information indicating their transmission node;
    a classifying section configured to classify the buffers that store the packets into a number of groups according to the transmission nodes of the packets;
    a selecting section configured to select at least one of the buffers of each said group;
    an output port configured to sequentially output the packets that are stored in the selected buffer;
    a measuring section configured to measure, on a transmission node basis, an index indicating the degree of traffic flow congestion of the packets so that the greater the degree of congestion, the larger the index measured by the measuring section; and
    a determining section configured to determine the number of packets output so that the larger the index of a transmission node, the larger the number of packets to be output through the output port.

9. The router of claim 8, wherein the measuring section measures the number of the buffers that have been classified by the classifying section as the index indicating the degree of traffic flow congestion of the packets.

10. The router of claim 8, wherein the measuring section measures a passage time that it takes for a packet that has arrived at its own router to leave the router as the index indicating the degree of traffic flow congestion of the packets.

11. The router of claim 8, wherein the measuring section measures the bus bandwidth usage as the index indicating the degree of traffic flow congestion of the packets.

12. The router of claim 8, wherein the transmission node is either a single bus master or a set of multiple bus masters, and
wherein the classifying section classifies the buffers into multiple groups according to the single bus master, the set of bus masters, or one or multiple routers that the packet has passed through on a transmission route.

13. The router of claim 8, wherein the classifying section classifies the buffers that store the packets into multiple groups according to the router(s) that the packets have passed through on the transmission route.

14. The router of claim 8, wherein there are multiple transmission nodes, which have been classified in advance so that each said transmission node belongs to any of multiple groups, and
wherein the classifying section classifies, according to the group to which a transmission node that has transmitted the packets belongs, the multiple buffers that store the packets into a number of groups.

\* \* \* \* \*